(12) United States Patent
Watts et al.

(10) Patent No.: US 11,792,122 B2
(45) Date of Patent: *Oct. 17, 2023

(54) SYSTEMS AND METHODS FOR SR-MPLS TO SRV6 INTERWORKING

(71) Applicant: Verizon Patent and Licensing Inc., Basking Ridge, NJ (US)

(72) Inventors: Mark T. Watts, Newport, RI (US); Gregory Pultorak, Columbia, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,738

(22) Filed: Dec. 21, 2021

(65) Prior Publication Data

US 2022/0116321 A1    Apr. 14, 2022

Related U.S. Application Data

(63) Continuation of application No. 16/830,602, filed on Mar. 26, 2020, now Pat. No. 11,233,733.

(51) Int. Cl.
| | |
|---|---|
| *H04L 45/50* | (2022.01) |
| *H04L 45/02* | (2022.01) |
| *H04L 47/125* | (2022.01) |
| *H04L 45/00* | (2022.01) |
| *H04L 101/659* | (2022.01) |

(52) U.S. Cl.
CPC ........... *H04L 45/507* (2013.01); *H04L 45/02* (2013.01); *H04L 45/04* (2013.01); *H04L 45/34* (2013.01); *H04L 47/125* (2013.01); *H04L 2101/659* (2022.05)

(58) Field of Classification Search
None
See application file for complete search history.

(56) References Cited

U.S. PATENT DOCUMENTS

| | | | |
|---|---|---|---|
| 10,938,717 | B1 | 3/2021 | Sundararajan et al. |
| 11,019,075 | B2 * | 5/2021 | Filsfils ............... H04L 63/0485 |
| 2015/0109902 | A1 | 4/2015 | Kumar et al. |
| 2017/0012895 | A1 | 1/2017 | Zhao et al. |
| 2017/0257228 | A1 | 9/2017 | Chen |
| 2017/0279710 | A1 | 9/2017 | Khan et al. |
| 2018/0375768 | A1 | 12/2018 | Previdi et al. |
| 2019/0007372 | A1 * | 1/2019 | Bhat ....................... H04L 45/50 |

(Continued)

FOREIGN PATENT DOCUMENTS

EP    3836490 A1 *  6/2021 ......... H04L 12/4633

*Primary Examiner* — Ajit Patel

(57) ABSTRACT

A controller determines a first path across a first segment routing (SR) domain and a second SR domain to a destination in the second SR domain, where the first SR domain uses a first SR protocol and the second SR domain uses a second SR protocol. The controller determines SR instructions that enable the interworking of the first SR domain and the second SR domain when data is routed across the first path to the destination. The controller sends, prior to the data being routed over the first path, the SR instructions to at least one of a first router in the first SR domain, a second router in the second SR domain, or a third router in the first SR domain to enable the interworking of the first and the second SR domains for segment routing the data across the first path.

20 Claims, 19 Drawing Sheets

(56) References Cited

U.S. PATENT DOCUMENTS

| | | |
|---|---|---|
| 2019/0116063 A1 | 4/2019 | Bottorff et al. |
| 2019/0190818 A1 | 6/2019 | Ceccarelli et al. |
| 2019/0280960 A1 | 9/2019 | Ceccarelli et al. |
| 2020/0127913 A1 | 4/2020 | Filsfils et al. |
| 2020/0177629 A1 | 6/2020 | Hooda et al. |
| 2020/0296029 A1 | 9/2020 | Shenoy |
| 2021/0021513 A1 | 1/2021 | Filsfils et al. |
| 2021/0092043 A1* | 3/2021 | Filsfils .................. H04L 61/30 |
| 2021/0092048 A1 | 3/2021 | Dutta |
| 2021/0092053 A1 | 3/2021 | Filsfils et al. |
| 2021/0266251 A1* | 8/2021 | Yadav .................... H04L 45/28 |

* cited by examiner

SYSTEMS AND METHODS FOR SR-MPLS TO SRV6 INTERWORKING

CROSS-REFERENCE TO RELATED APPLICATION

The present application is a continuation of, and claims priority to, U.S. application Ser. No. 16/830,602 entitled "Systems and Methods for SR-MPLS to SRv6 Interworking," filed Mar. 26, 2020, the content of which is incorporated by reference herein in its entirety.

BACKGROUND

Multiprotocol label switching (MPLS) is a connection-oriented routing technique used in data networks for directing data from one node to a next node in the network based on path labels rather than network addresses (e.g., Internet Protocol (IP) traffic routing). Use of the path labels, instead of network addresses, avoids complex routing table lookups.

MPLS, being a connection-oriented routing packet forwarding mechanism, forwards packets based on a fixed-length, short label that corresponds to a label switched path (LSP) that has been previously established via signaling between an ingress and egress node in the network, and via signaling between intermediate nodes on the path between the ingress and egress nodes. Forwarding attributes (e.g., bandwidth) for the virtual link (i.e., label switch path) are typically negotiated during the connection set-up signaling. MPLS, therefore, introduces signaling overhead to establish the label switch path, but results in subsequently less complicated packet forwarding with less delay relative to IP.

Segment routing (SR) is a modern variant of source routing in which network state information is removed from intermediate routers and path state information is placed into the packet headers for use by the intermediate routers. When a packet arrives at a SR ingress router, the ingress routers subjects the packet to a forwarding policy that identifies a SR path from the ingress router to the packet's destination. The SR path includes a list of segments to connect the ingress router to an egress router. In segment routing, a single SR segment includes an instruction that causes a packet to traverse a section of the network topology. The list of segments in the SR path that may be ordered in some embodiments, therefore, includes a sequence of multiple instructions that cause the packet to traverse multiple segments in an order determined by the ordered list of segments.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement segment routing across a network path that crosses between a first segment routing (SR) protocol network domain that employs a first SR protocol, and a second SR protocol network domain that employs a second SR protocol that may be different than the first SR protocol. In one exemplary implementation, the first SR protocol domain may employ Segment Routing-Multiprotocol Label Switching (SR-MPLS) as the SR protocol, and the second SR protocol domain that may employ Segment Routing Internet Protocol (IP) version 6 (SRv6) as the SR protocol. As described herein, a SR domains interworking controller may be implemented in the network to facilitate the interworking of segment routing between the first SR protocol domain (e.g., a SR-MPLS domain) and the second SR protocol domain (e.g., a SRv6 domain). In some implementations, the SR domains Interworking controller determines a path across the network between a source and a destination and determines a first SR protocol domain sub-path (e.g., SR-MPLS sub-path) and a second SR protocol domain sub-path (e.g., SRv6 sub-path) based on known network topology information of the first and second SR protocol domains. The SR domains Interworking controller may additionally push first SR protocol domain label stacks (e.g., SR-MPLS label stacks) and/or second SR protocol domain (e.g., SRv6 domain) extension headers to appropriate ingress and/or egress routers in both the first SR protocol domain and the second SR protocol domain to enable segment routing to seamlessly occur between the two different segment routing domains. In some implementations described herein, the SR domains interworking controller facilitates the interworking of segment routing between SR-MPLS domains and SRv6 domains. However, in other implementations, the SR domains interworking controller may facilitate the interworking of segment routing between other types of segment routing protocol domains.

Figure 1:
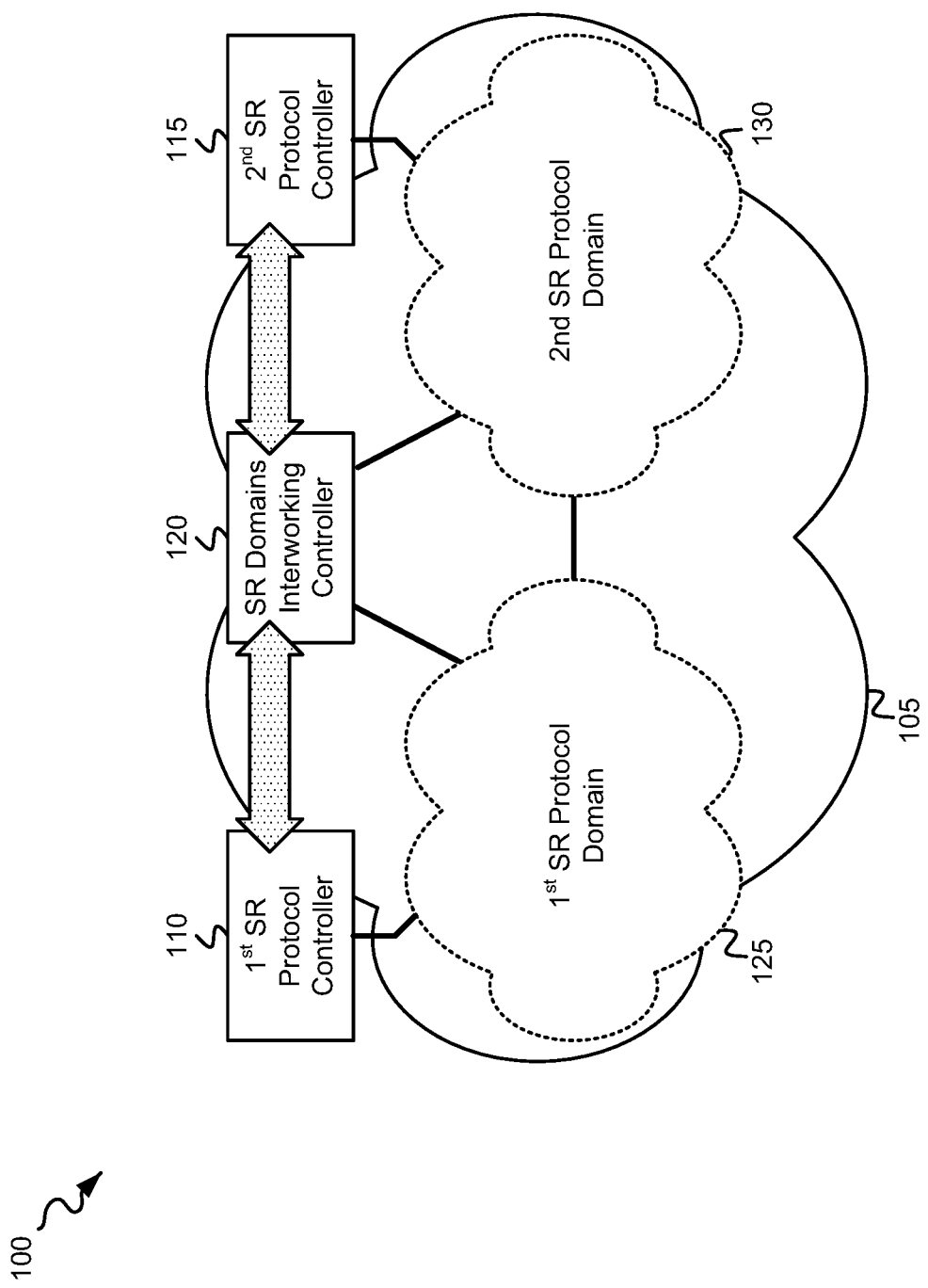
FIG. 1 illustrates an exemplary network environment in which data units may be routed across two different network domains that each employ different types of segment routing protocols.

FIG. 1 illustrates an exemplary network environment 100 in which data units may be routed across two different network domains that each employ different types of segment routing protocols. Network environment 100 may include a network 105, a first SR protocol controller 110, a second SR protocol controller 115, and a SR domains Interworking controller 120. In the exemplary network environment 100 shown in FIG. 1, a first SR protocol domain 125 employs a first SR protocol and a second SR protocol domain 130 employs a second SR protocol. In one implementation, the first SR protocol includes a Segment Routing-Multiprotocol Label Switching (SR-MPLS) segment routing protocol and the second SR protocol includes a SR Internet Protocol (IP) version 6 (SRv6) segment routing protocol. In other network environments (not shown), first SR protocol domain 125 may employ a first segment routing protocol that may, or may not, be SR-MPLS, and second SR protocol domain 130 may employ a second, different segment routing protocol that may, or may not, be SRv6. Therefore, first SR protocol domain 125 and second SR protocol domain 130 may employ different segment routing protocols than those shown.

Network 105 may include one or more networks that employ packet switching protocols. Network 105 may include, for example, a wireless public land mobile network (PLMN) (e.g., a Long-Term Evolution (LTE) PLMN, a Fifth Generation (5G) PLMN, and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). As described further with respect to FIG. 2 below, network 105 may include multiple routers that use SR protocols and packet switching for forwarding packets via paths from a source node to a destination node. The routers may reside in first SR protocol domain 125, in second SR protocol domain 130, and/or in another region of network 105 outside of domains 125 and 130.

First SR protocol controller 110 may be implemented by one or more network devices that determine optimal paths, having a required or requested delay, bandwidth, and/or diversity, between source nodes and destination nodes within first SR protocol domain 125 and determine a corresponding ordered SR segment list for the determined optimal path. Controller 110 further generates a label stack (e.g., an SR-MPLS label stack) for the determined SR segment list and pushes the label stack to an ingress router (not shown) in first SR protocol domain 125 on the determined path. The label stack may be subsequently used by routers, within first SR protocol domain 125, along the determined path for forwarding packets between a source node and a destination node.

Second SR protocol domain 115 may be implemented by one or more network devices that determine optimal paths, having a required or requested delay, bandwidth, and/or diversity, between source nodes and destination nodes within second SR protocol domain 130 and determine a corresponding ordered SR segment list for the determined optimal path. Controller 115 further generates a second SR protocol extension header, inserts the determined SR segment list as an ordered list within the extension header, and pushes the second SR protocol extension header to an ingress router (not shown) in domain 130 on the determined path. The SR segment list in the extension header may be subsequently used by routers, within domain 130, along the determined path for forwarding packets between a source node and a destination node.

SR domains Interworking controller 120 may be implemented by one or more network devices that determine optimal paths, having a required or requested delay, bandwidth, and/or diversity, between source nodes and destination nodes in circumstances where the optimal paths cross from SR protocol domain 125 to SR protocol domain 130, or from SR protocol domain 130 to SR protocol domain 125. Controller 120 enables the interworking of segment routing protocols between domain 125 and domain 130 using techniques described herein. For each determined path that crosses between SR protocol domain 125 and SR protocol domain 130, controller 120 determines a corresponding ordered SR segment list for a sub-path within domain 125 and a corresponding ordered segment list for a sub-path within domain 130.

SR protocol domain 125 includes a first portion of network 105 that has routers that employ a first segment routing protocol (e.g., SR-MPLS) for routing data units. SR protocol domain 130 includes a second portion of network 105 that has routers that employ a second segment routing protocol (e.g., SRv6) for routing data units. One or more routers within domain 130 may have links connecting them to one or more routers within domain 125 such that a path between a source and destination may cross from domain 125 to domain 130, or from domain 130 to domain 125.

If a path from a source to a destination across network 105 crosses from domain 125 to domain 130, controller 120 generates a label stack for the determined SR segment list for the sub-path within SR protocol domain 125 and pushes the label stack to an ingress router (not shown) in domain 125 on the determined path. Controller 120 further generates a second SR protocol extension header (e.g., SRv6 extension header) and inserts the determined SR segment list for the sub-path within domain 130 as an ordered list within the extension header. Controller 120 then pushes the second SR protocol extension header to an ingress router (not shown) in domain 130 on the determined path. Pushing of the label stack to the ingress router in the first SR protocol domain 125, and pushing of the extension header to the ingress router in the second SR protocol domain, enables these ingress routers to facilitate the interworking of the two different SR protocols for segment routing of data units across the sub-path within the first SR protocol domain 125 and the sub-path within the second SR protocol domain 130.

If a path from a source to a destination across network 105 crosses from domain 130 to domain 125, controller 120 generates a second SR protocol extension header and inserts the determined SR segment list for the sub-path within domain 130 as an ordered list within the extension header. Controller 120 then pushes the second SR protocol extension header to an ingress router (not shown) in domain 130 on the determined path. Controller 120 also generates a label stack for the determined SR segment list for the sub-path within first SR protocol domain 125 (e.g., a SR-MPLS domain) and pushes the label stack to an egress router (not shown) in domain 130 on the determined path. Pushing of the extension header stack to the ingress router in the second SR protocol domain 130, and pushing of the label stack to the egress router in the second SR protocol domain, enables these routers to facilitate the interworking of the two different SR protocols for segment routing of data units across the sub-path within the second SR protocol domain 130 and the sub-path within the first SR protocol domain 125.

The configuration of network components of network environment 100 shown in FIG. 1 is for illustrative purposes. Other configurations may be implemented. Therefore, network environment 100 may include additional, fewer and/or different components, that may be configured in a different arrangement, than that depicted in FIG. 1. For example, though controllers 110, 115, and 120 are shown as separate network devices, in some implementations, controller 110, controller 115, and/or controller 120 may be implemented by a single network device.

Figure 2:
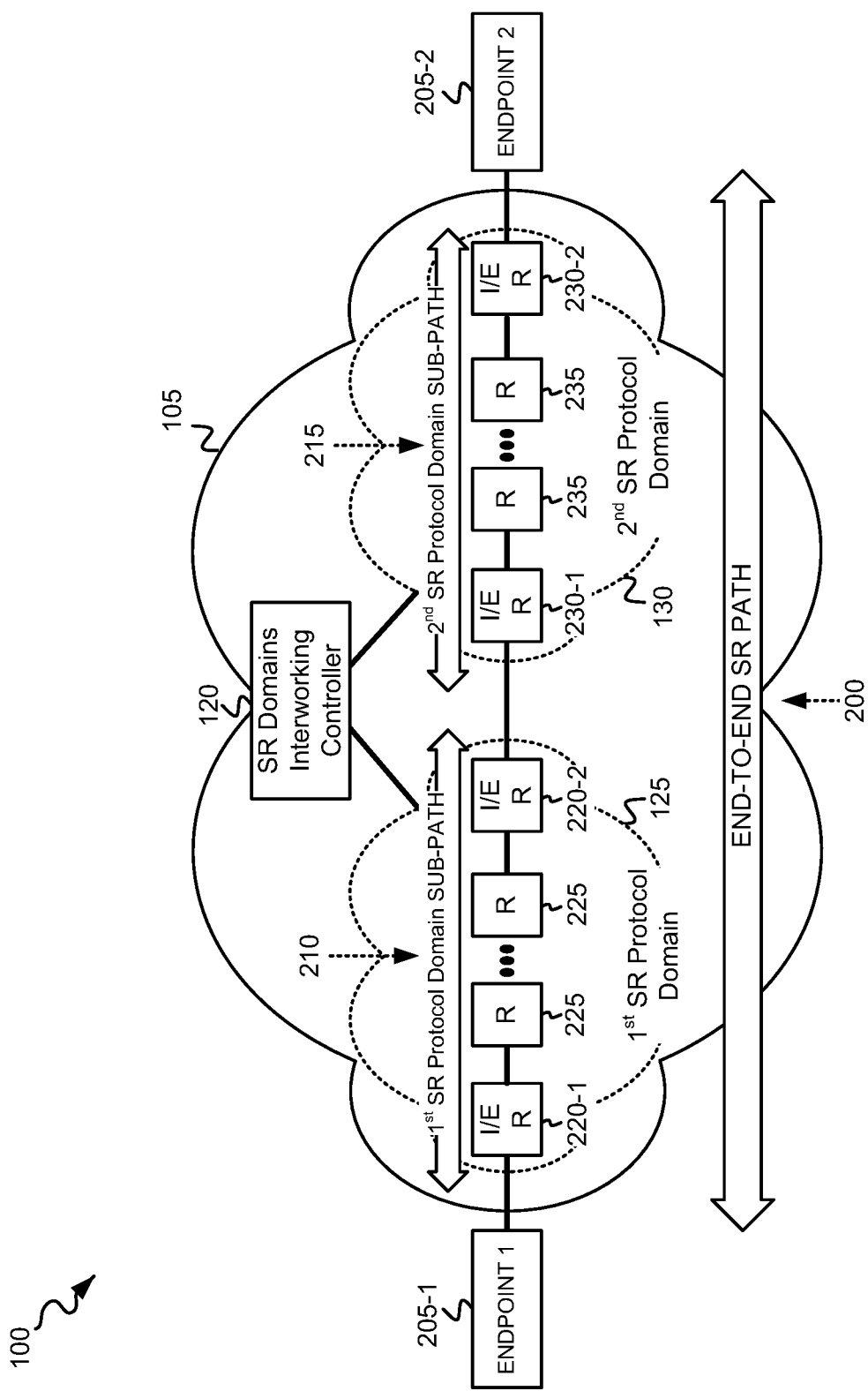
FIG. 2 depicts further details of segment routing path establishment within the network environment of FIG. 1.

FIG. 2 depicts further details of segment routing path establishment within network environment 100. As shown, an end-to-end SR path 200 may be established between a first endpoint 205-1 and a second endpoint 205-2 that are both connected to network 105. In one implementation, SR domains interworking controller 120 may establish the end-to-end SR path 200 based on a knowledge of network topology within domain 125 and domain 130 and, in some aspects, based on other factors (e.g., delay, bandwidth, diversity, etc.). The end-to-end SR path 200 may include a first path from endpoint 205-1 to endpoint 205-2, and/or a second path from endpoint 205-2 to endpoint 205-1.

Endpoints 205-1 and 205-2 may each include any type of electronic device having a wired or wireless communication capability. Endpoints 205-1 and 205-2 may include, for example, a laptop, palmtop, desktop, or tablet computer; a personal digital assistant (PDA); a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; a device in a vehicle; a wireless telematics device; or an Internet of Things (IoT) or Machine-to-Machine (M2M) device. A user (not shown) may carry, use, administer, and/or operate each of endpoints 205-1 and 205-2.

End-to-end SR path 200 may include a first SR protocol sub-path 210 through domain 125 and a second SR protocol sub-path 215 through domain 130, where sub-path 210 interconnects with sub-path 215 to create end-to-end SR path 200. In one implementation, first SR protocol sub-path 210 includes a SR-MPLS sub-path through an SR-MPLS domain 125, and second SR protocol sub-path 210 includes a SRv6 sub-path through a SRv6 domain 130. Sub-path 210 may include one or more interconnected segments that include ingress/egress routers 220-1 and 220-2 and intermediate routers 225. A data unit may transit from endpoint 1 205-1 to endpoint 2 205-2 across end-to-end SR path 200, including first transiting sub-path 210 and then transiting sub-path 215. The data unit, when transiting from endpoint 205-1 to endpoint 2 205-2 over sub-path 210, may enter domain 125 at ingress router 220-1, hop via multiple intermediate routers 225, and exit domain 125 at egress router 220-2. Sub-path 215 may include one or more interconnected segments that include ingress/egress routers 230-1 and 230-2 and intermediate routers 235. The data unit transiting from endpoint 205-1 to endpoint 2 205-2 over sub-path 215 may enter domain 130 at ingress router 230-1, hop via multiple intermediate routers 235, and exit domain 130 at egress router 230-2.

Alternatively, the data unit may transit from endpoint 2 205-2 to endpoint 1 205-1 across end-to-end SR path 200, including first transiting sub-path 215 and then transiting sub-path 210. The data unit, when transiting from endpoint 2 205-2 to endpoint 1 205-1 over sub-path 215, may enter domain 130 at ingress router 230-2, hop via multiple intermediate routers 235, and exit domain 130 at egress router 230-1. The data unit transiting from endpoint 2 205-2 to endpoint 1 205-1 over sub-path 210 may enter domain 125 at ingress router 220-2, hop via multiple intermediate routers 225, and exit domain 125 at egress router 220-1.

Subsequent to determining an end-to-end SR path 200 from endpoint 1 205-1 to endpoint 2 205-2, controller 120 may determine a second SR protocol domain segment identifier (SID) for segment routing between first SR protocol domain 125 and second SR protocol domain 130, and may determine a label stack (e.g., SR-MPLS label stack) that corresponds to sub-path 210. Controller 120 pushes the label stack, that corresponds to sub-path 210, to an ingress router in domain 125. Controller 120 may additionally generate a second SR protocol domain extension header (e.g., SRv6 extension header) for segment routing across domain 130. Controller 120 binds the second SR protocol SID to the generated second SR protocol domain extension header and pushes the second SR protocol domain SID and second SR protocol domain extension header to an ingress router in domain 130.

Subsequent to determining an end-to-end SR path 200 from endpoint 2 205-2 to endpoint 1 205-1, controller 120 may generate a second SR protocol domain extension header (e.g., an SRv6 extension header) for segment routing across domain 130. Controller 120 may determine a label stack (e.g., SR-MPLS label stack) that corresponds to sub-path 210, and a first SR protocol domain SID (e.g., SR-MPLS SID) for segment routing between domain 130 and domain 125. Controller 120 binds the determined first SR protocol domain SID to the determined label stack and pushes the first SR protocol domain SID and label stack to an egress router 230-1 in domain 130. Controller 120 additionally generates a second SR protocol extension header (e.g., a SRv6 extension header) for segment routing across domain 130 and inserts the first SR protocol domain SID in a last segment of the segment list of the second SR protocol domain extension header. Controller 120 pushes the second SR protocol domain extension header to an ingress router 230-2 in SRv6 domain 130.

Figure 3:
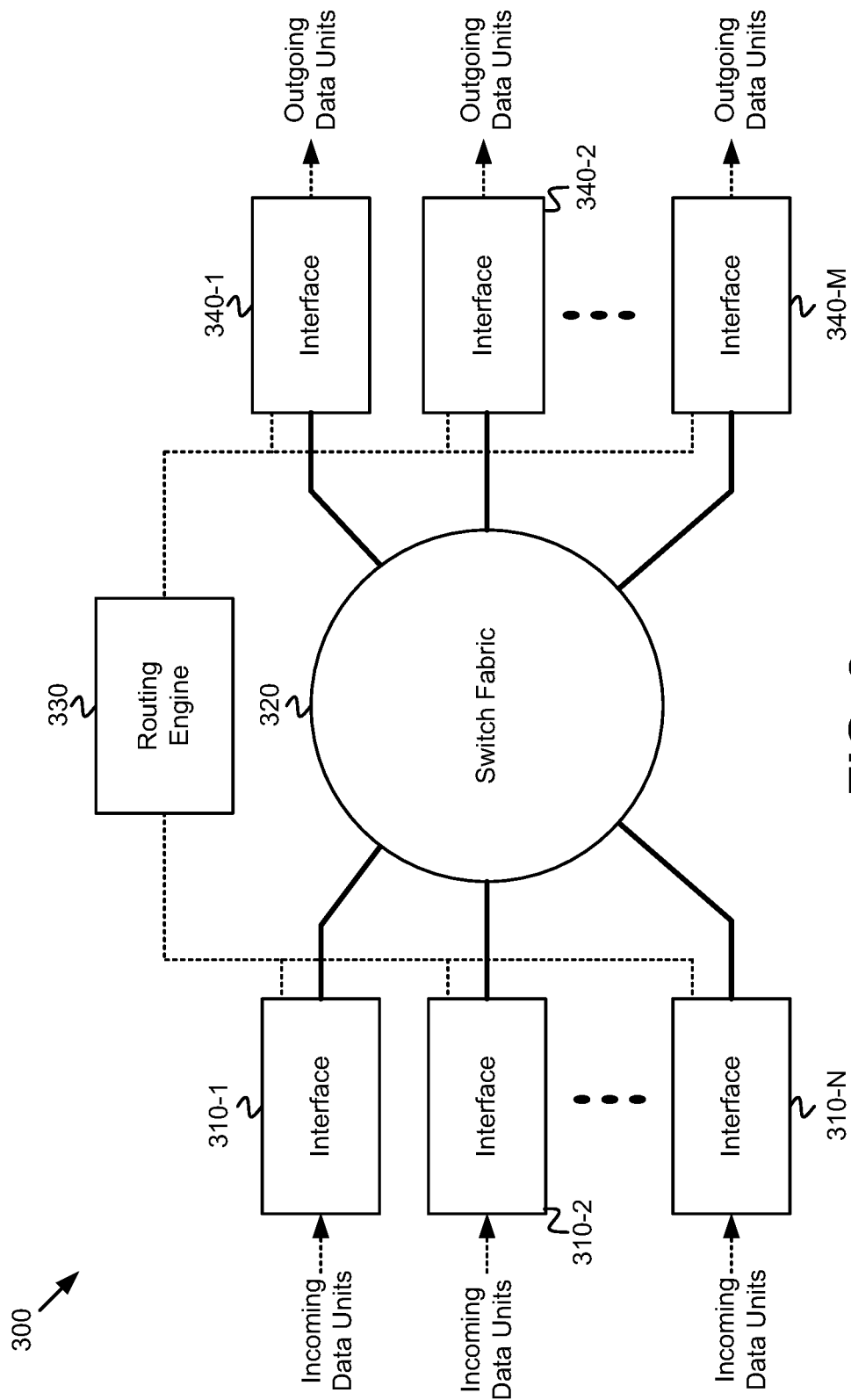
FIG. 3 illustrates a configuration of a router that may correspond to the ingress/egress routers and intermediate routers of FIG. 2.

FIG. 3 illustrates a configuration of a router 300 that may correspond to ingress/egress routers 220-1, 220-2, 230-1, and 230-2, and intermediate routers 225 and 235. Router 300 receives one or more data units from one or more incoming links, processes the data units using, for example, segment routing protocols (e.g., SRv6 protocol, SR-MPLS protocol), and transmits the data units on one or more outgoing SR paths. The data units may include packets, cells, or datagrams; fragments of packets, cells, or datagrams; or other types of data. The one or more incoming links and the one or more outgoing links may connect to other nodes (e.g., routers) in network 105.

Router 300 may include one or more ingress interfaces 310-1 through 310-N (generically referred to herein as an "ingress interface 310" or "ingress interfaces 310"), a switch fabric 320, a routing engine 330, and one or more egress interfaces 340-1 through 340-M (generically referred to herein as an "egress interface 340" or "egress interfaces 340"). Each ingress interface 310 receives incoming data units via one or more physical links and forwards the received data units through switch fabric 320 to a respective egress interface 340. Each ingress interface 310 forwards received data units to a respective egress interface 340 using, for example, forwarding tables received from routing engine 330.

Routing engine 330 may communicate with other nodes, such as controllers 110, 115 and/or 120, to establish SR paths for SR and forwarding of data units. Routing engine 330 may create forwarding tables based on segment routing information received from other nodes, such as controllers 110, 115, and/or 120, and may download the forwarding table to each ingress interface 310 and each egress interface 340. Routing engine 330 may also perform other general control and monitoring functions for router 300.

Switch fabric 320 may include one or more switching planes to facilitate communication between ingress interface 310-1 through 310-N and egress interfaces 340-1 through 340-M. In one exemplary implementation, each of the switching planes may include a three-stage switch of crossbar elements. Other types of switching planes may, however, be used in switch fabric 320. Egress interfaces 340-1 through 340-M may receive data units from switch fabric 320 and may forward the data units towards destinations in the network via one or more outgoing physical links.

Router 300 may include fewer, additional and/or different components that may be arranged differently than shown in FIG. 3. The interfaces in FIG. 3 have been arbitrarily designated as "ingress interfaces" or "egress interfaces" for purposes of illustration. Each one of interfaces 310-1 through 310-N or 340-1 through 340-M may act as an ingress and/or an egress interface. Thus, each one of interfaces 310-1 through 310-N or 340-1 through 340-M may receive data units from network 105, or forward data units received from switch fabric 320 towards destinations in network 105.

Figure 4:
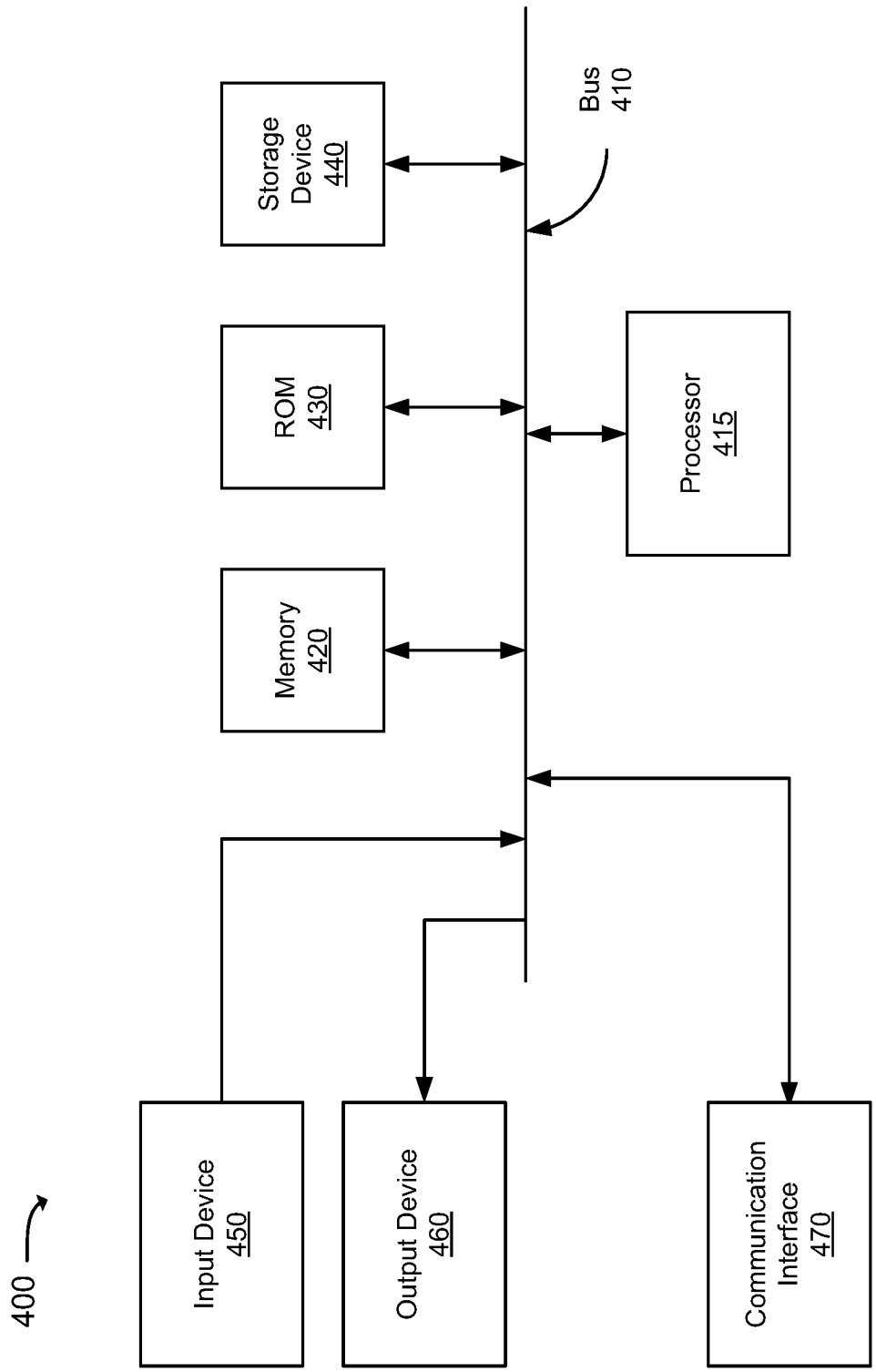
FIG. 4 is a diagram that depicts exemplary components of a device that may correspond to the controllers and endpoint devices of FIGS. 1 and 2.

FIG. 4 is a diagram that depicts exemplary components of a device 400. Controllers 110, 115, and 120, and endpoints 205-1 and 205-2 may be arranged in a same, or similar, configuration as device 400. Device 400 may include a bus 410, a processor 415, a main memory 420, a read only memory (ROM) 430, a storage device 440, an input device 450, an output device 460, and a communication interface 470. Bus 410 may include a path that permits communication among the other components of device 400.

Processor 415 may include one or more processors or microprocessors which may interpret and execute stored instructions associated with one or more processes. Additionally, or alternatively, processor 415 may include processing logic that implements the one or more processes. For example, processor 415 may include programmable logic such as Field Programmable Gate Arrays (FPGAs) or accelerators. Processor 415 may include software, hardware, or a combination of software and hardware for executing the processes described herein.

Main memory 420 may include a random access memory (RAM) or another type of dynamic storage device that may store information and, in some implementations, instructions for execution by processor 415. ROM 430 may include a ROM device or another type of static storage device (e.g., Electrically Erasable Programmable ROM (EEPROM)) that may store static information and, in some implementations, instructions for use by processor 415. Storage device 440 may include a magnetic, optical, and/or solid state (e.g., flash drive) recording medium and its corresponding drive. Main memory 420, ROM 430 and storage device 440 may each be referred to herein as a "non-transitory computer-readable medium" or a "non-transitory storage medium." The processes/methods set forth herein (or at least a portion of the processes/methods set forth herein) can be implemented as instructions that are stored in main memory 420, ROM 430 and/or storage device 440 for execution by processor 415 of device 400.

Input device 450 may include one or more devices that permit an operator to input information to device 400, such as, for example, a keypad or a keyboard, a display with a touch sensitive panel, voice recognition and/or biometric mechanisms, etc. Output device 460 may include one or more devices that output information to the operator, including a display, a speaker, etc. Input device 450 and output device 460 may, in some implementations, be implemented as a user interface (UI), such as a touch screen display, that displays UI information, and which receives user input via the UI. Communication interface 470 may include one or more transceivers that enable device 400 to communicate with other devices and/or systems. For example, if device 400 is a wireless User Equipment (UE) endpoint 205, communication interface 470 may include a wireless transceiver for communicating via a wireless link with network 105. As another example, if device 400 is a controller 110, 115, or 120, communication interface 470 may include a wired transceiver for communicating with network 105, or for communicating with other devices within, or connected to, network 105.

Device 400 may perform certain operations or processes, as may be described herein. Device 400 may perform these operations in response to processor 415 executing software instructions contained in a computer-readable medium, such as memory 420. A computer-readable medium may be defined as a physical or logical memory device. A logical memory device may include memory space within a single physical memory device or spread across multiple physical memory devices. The software instructions may be read into main memory 420 from another computer-readable medium, such as storage device 440, or from another device via communication interface 470. The software instructions contained in main memory 420 may cause processor 415 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of device 400 illustrated in FIG. 4 is for illustrative purposes only. Other configurations may be implemented. Therefore, device 400 may include additional, fewer and/or different components, arranged in a different configuration, than depicted in FIG. 4.

Figure 5:
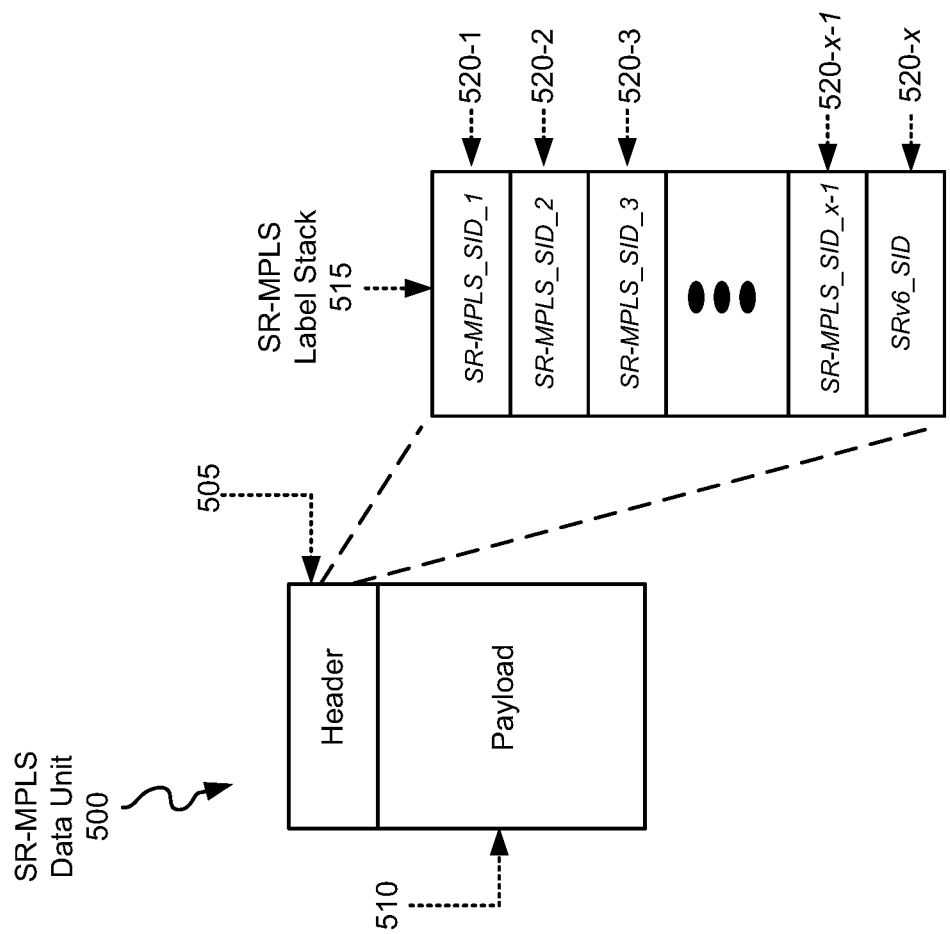
FIG. 5 illustrates an exemplary data unit that may be routed and forwarded, router to router through the first segment routing protocol domain of the network of FIGS. 1 and 2.

FIG. 5 illustrates an exemplary data unit 500 that may be routed and forwarded, router to router (i.e., hop by hop), through domain 125 of network 105 from a source towards a destination. In the exemplary data unit 500 shown in FIG.

5, domain 125 includes a SR-MPLS domain, and data unit 500 includes a SR-MPLS data unit 500. In other implementations domain 125 may include a different type of segment routing protocol and data unit 500 may include a different type of segment routing protocol data unit. Data unit 500 may include any type of encapsulated data, such as, for example, a packet, a cell, or a datagram; a fragment of a packet, cell, or a datagram; or other types of data. Data unit 500 may include a header 505 and a payload 510. As shown, a SR-MPLS label stack 515 may be inserted into header 505 prior to forwarding data unit 500 from an ingress router to a next router along a SR path within SR-MPLS domain 125. SR-MPLS label stack 515 may include an ordered list of SR-MPLS segment identifiers (SIDs) 520-1 through 520-$x$–1 that may be used for routing data unit 500 through SR-MPLS domain 125 of network 105. SR-MPLS label stack 515 may additionally include, as a last label in the label stack, a SRv6 domain SID 520-$x$ that may be used by a router receiving data unit 500 to retrieve an SRv6 extension header from router memory, containing a SRv6 domain segment list that is bound to the SRv6 domain SID 520-$x$, that may be used for routing data unit 500 through a SRv6 domain 130 that is connected to the SR-MPLS domain 125. The SRv6 domain SID 520-$x$ may, therefore, be used for interworking the segment routing between SR-MPLS domain 125, where routers use the SR-MPLS protocol, and SRv6 domain 130, where routers use the SRv6 protocol.

Figure 6:
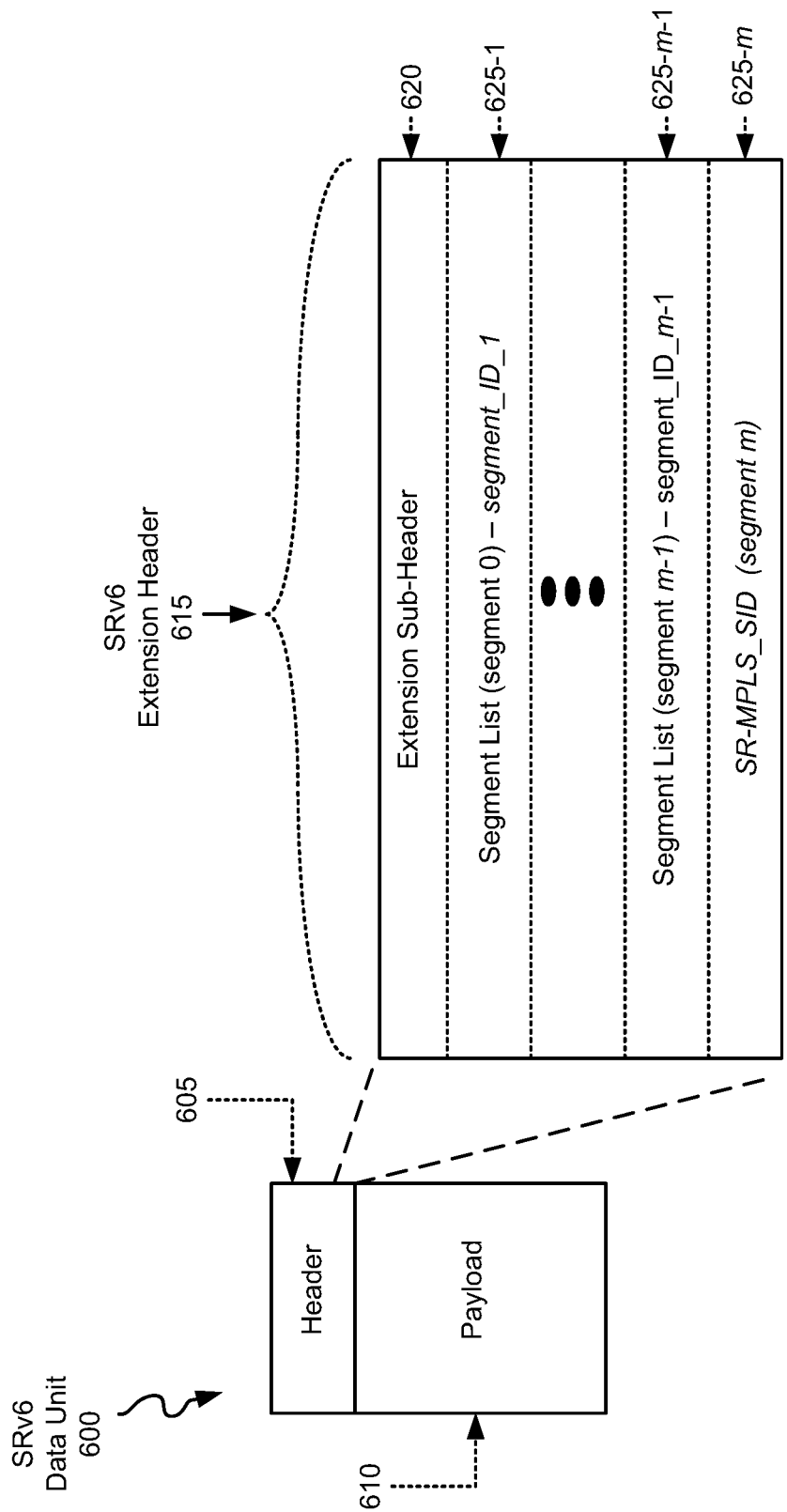
FIG. 6 illustrates an exemplary data unit that may be routed and forwarded, from router to router, through the second segment routing protocol domain of the network 105 of FIGS. 1 and 2.

FIG. 6 illustrates an exemplary data unit 600 that may be routed and forwarded, from router to router, through domain 130 of network 105 from a source towards a destination. In the exemplary data unit 600 shown in FIG. 6, domain 130 includes a SRv6 domain, and data unit 600 includes a SRv6 data unit 500. In other implementations domain 130 may include a different type of segment routing protocol and data unit 600 may include a different type of segment routing protocol data unit. Similar to data unit 500, data unit 600 may include any type of encapsulated data, such as, for example, a packet, a cell, or a datagram; a fragment of a packet, cell, or a datagram; or other types of data. Data unit 600 may include a header 605 and a payload 610. As shown, a SRv6 extension header 615 may be inserted into header 605 prior to forwarding data unit 600 from an ingress router to a next router along a SR path in SRv6 domain 130. SRv6 extension header 615 may include an extension sub-header 620, and a segment list that includes an ordered list of SIDs 625-1 through 625-$m$–1 within SRv6 domain 130, and, as a last entry in the segment list, a SR-MPLS SID 625-$m$.

Extension sub-header 620 may include various standard SRv6 overhead fields (e.g., routing type, extension header length, etc.) used by the SRv6 segment routing protocol. The segment list of SIDs 625-1 through 625-$m$–1 include SIDs for each segment in the path across SRv6 domain 130, with segment 625-1 identifying the first segment in SRv6 domain 130 along the path, and segment 625-$m$–1 identifying the $m$–1th segment in SRv6 domain 130 along the path, towards the path destination.

SR-MPLS SID 625-$m$ may include a segment identifier that may be used by an egress router in SRv6 domain 130 to retrieve an SR-MPLS label stack from router memory that may subsequently be used for routing data unit 600 through a SR-MPLS domain 125 that is connected to the SRv6 domain 130. The SR-MPLS SID 625-$m$ may, therefore, be used for interworking the segment routing between SRv6 domain 130, where routers use the SRv6 protocol, and SR-MPLS domain 125, where routers use SR-MPLS protocol.

Figure 7A:
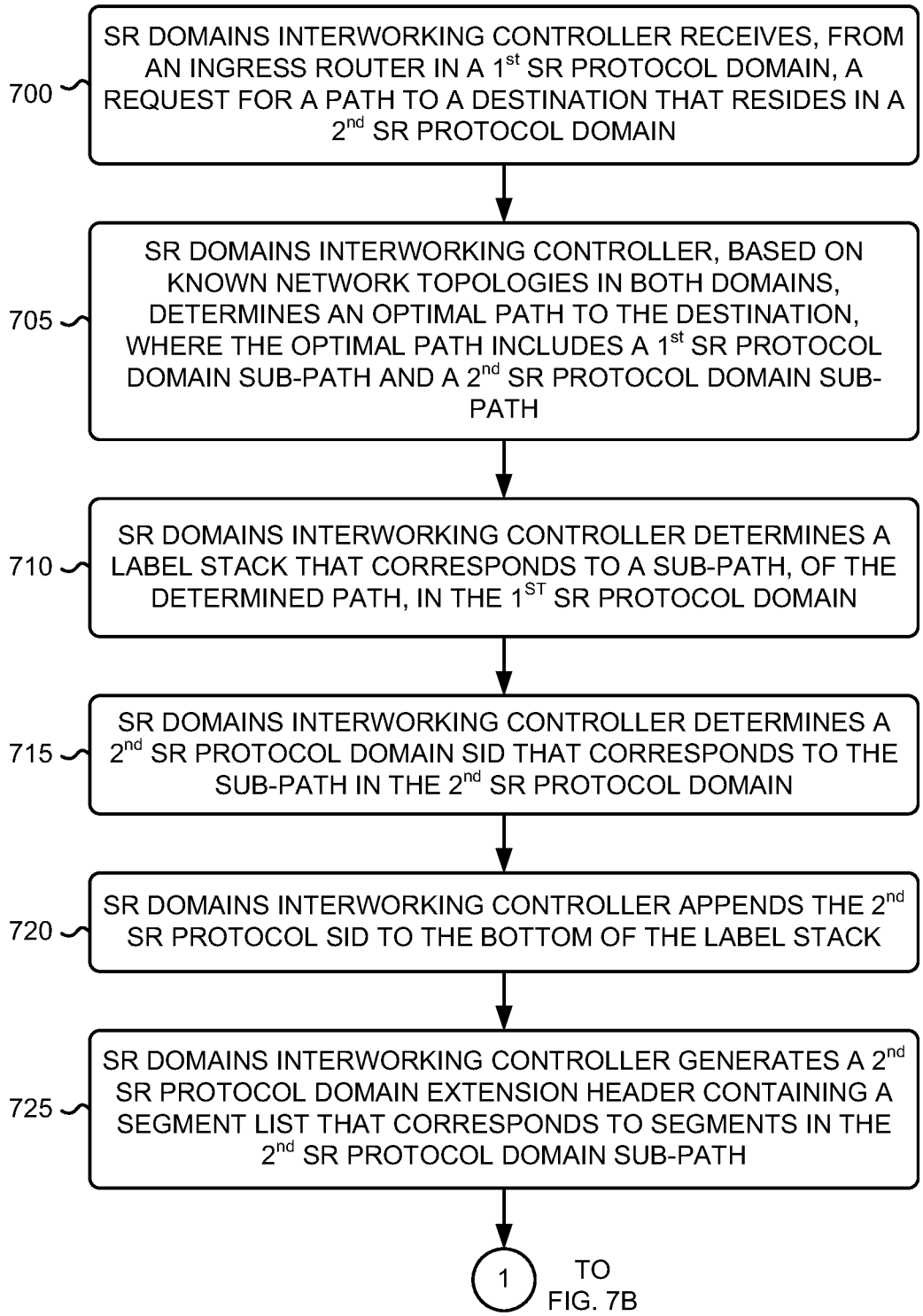
FIGS. 7A and 7B are flow diagrams of an exemplary process for establishing a path between the first segment routing protocol domain and the second segment routing protocol domain in the network of FIGS. 1 and 2.
Figure 7B:
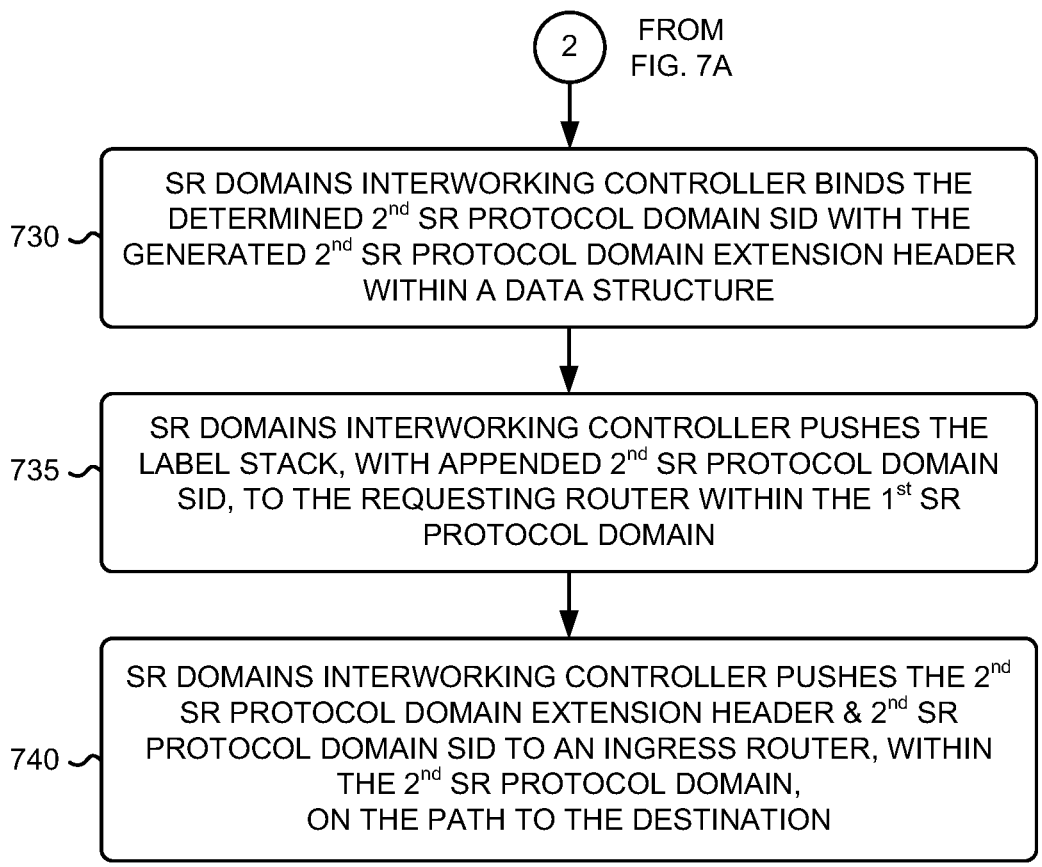
Figure 8:
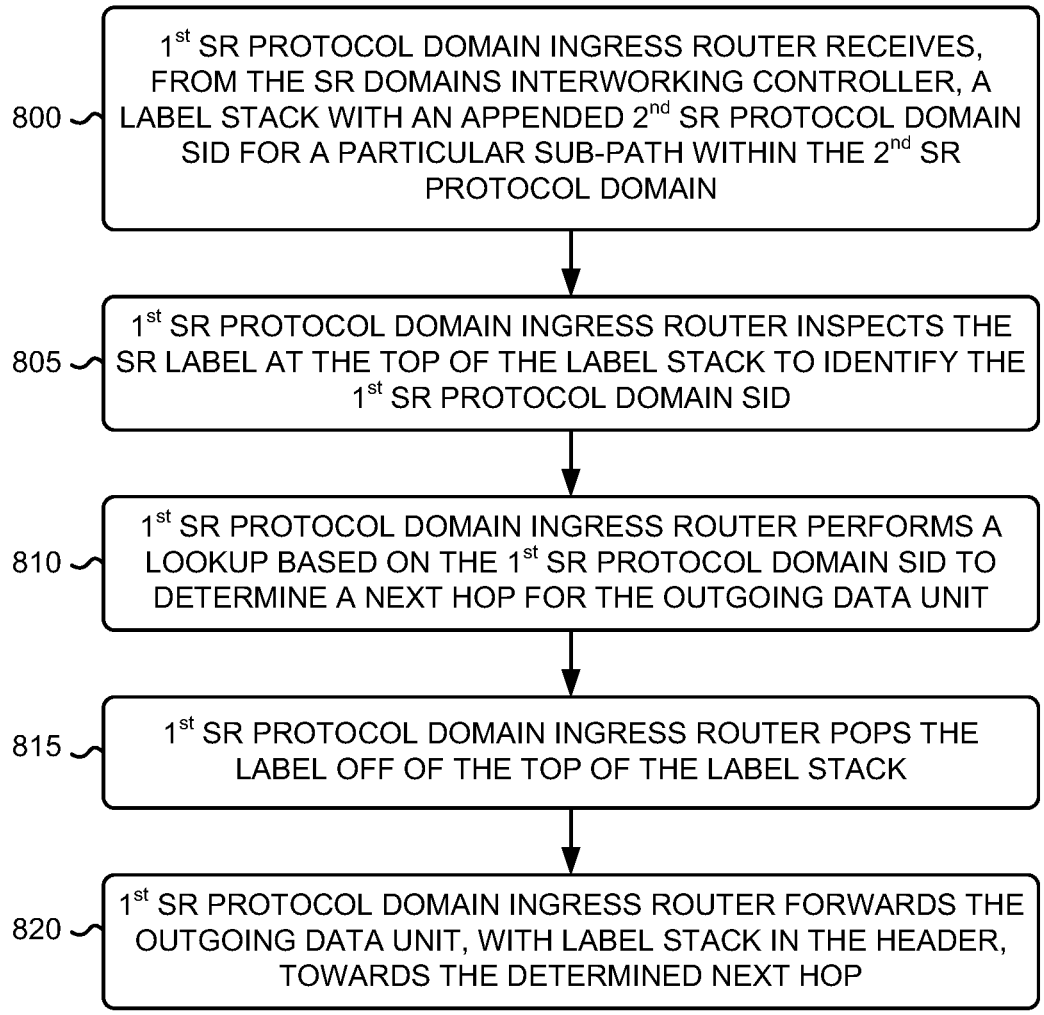
FIG. 8 is a flow diagram of an exemplary process for an ingress router in the first segment routing protocol domain of FIG. 1 to initiate the segment routing of a data unit across a first segment routing protocol domain sub-path and into the second segment routing protocol domain.

As described in detail below, FIGS. 7A and 7B, 8, and 9, in conjunction with the segment routing example of FIG. 10, describe exemplary processes associated with segment routing between first SR protocol domain 125 and second SR protocol domain 130 in network 105. FIGS. 7A and 7B describe path establishment, by controller 120, across domain 125 and domain 130, and the pushing of first SR protocol domain label stacks and second SR protocol domain extension headers to appropriate routers in domains 125 and 130 to enable the interworking of the segment routing when forwarding data units from a source to a destination over the established path across domain 125 and domain 130. FIG. 8 describes the receipt of a label stack, from controller 120 at an ingress router in domain 125, and use of that label stack for forwarding data units along the established sub-path in first SR protocol domain 125 that corresponds to the label stack. FIG. 9 describes the receipt of a second SR protocol domain extension header, from controller 120 at an ingress router in domain 130, and use of the extension header for forwarding data units along the established sub-path in second SR protocol domain 130 that corresponds to a segment list contained in the extension header.

FIGS. 7A and 7B are flow diagrams of an exemplary process for establishing a path between a first SR protocol domain 125 and a second SR protocol domain 130 in network 105, and providing appropriate first SR protocol domain label stacks and second SR protocol domain extension headers to ingress routers in those domains to enable data units to be forwarded via a path across domain 125 and domain 130 from a source to a destination. The exemplary process of FIGS. 7A and 7B may be implemented by SR Domains Interworking Controller 120 (referred to below as "controller 120"), possibly in conjunction with first SR protocol controller 110 and/or second SR protocol controller 115. The exemplary process of FIGS. 7A and 7B is described below with reference to an example of network routing from domain 125 to domain 130, depicted in FIG. 10, where domain 125 includes a SR-MPLS domain and where domain 130 includes a SRv6 domain.

The exemplary process includes controller 120 receiving, from an ingress router 220-1 in a first SR protocol domain 125, a request for a path to a destination that resides in a second SR protocol domain 130 (block 700). For example, referring to FIG. 2, ingress router 220-1, in domain 125, may send a request that requests a path from ingress router 220-1 to a destination (e.g., endpoint 2 205-2), where the path crosses domain 130. In one implementation, ingress router 220-1 may send the request to first SR protocol domain controller 110 which, in turn, may forward the request to SR domains interworking controller 120. Controller 120, based on known network topologies in both of domain 125 and domain 130, determines an optimal path to the destination, where the optimal path includes a first SR protocol domain sub-path and a second SR protocol domain sub-path (block 705). Controller 120 may employ existing network routing techniques to determine the optimal path from ingress router 220-1 to the destination of the data unit. In the example of FIG. 10, controller 120 determines a sub-path through SR-MPLS domain 125 that includes segment SIDs "101" and "1001," and a sub-path through SRv6 domain 130 that includes segment SIDs "1004," "1003," "1005," and "102."

Controller 120 determines a label stack that corresponds to a sub-path, of the determined path, in the first SR protocol domain 125 (block 710). Controller 120 identifies each segment, in order, along the sub-path in domain 125 and determines the first SR protocol domain SID for each segment. Referring to the example of FIG. 10, SR-MPLS domain 125 may be associated with a Segment Routing Global Block (SRGB) that includes a range of segment ID values that are reserved for segment routing among SR-MPLS-enabled nodes and which have global significance throughout SR-MPLS domain 125. In this example, controller 120 inserts the identified SIDs in a label stack in an order such that the SIDs may, in one implementation, be ordered from farthest segment at the bottom of the label stack to the closest segment at the top of the stack. For example, referring to the SR-MPLS label stack 515 in FIG. 5, controller 120 inserts the closest segment SID at the top 520-1 of the stack 515, inserts the next closest segment SID at the next label 520-2, inserts the third closest segment SID at the next label 520-3, and so on until controller 120 inserts a last, farthest segment SID at the position 520-$x$–1 in the label stack 515.

Controller 120 determines a second SR protocol domain SID that corresponds to the sub-path in the second SR protocol domain 130 (block 715). Referring to the example of FIG. 10, SRv6 domain 130 may be associated with a SRGB that includes a range of segment ID values that are reserved for segment routing among SRv6-enabled nodes and which have global significance throughout SRv6 domain 130. In this example, controller 120 determines, from the SRv6 SRGB, a SID to be used to identify the sub-path in the SRv6 domain 130. Controller 120 appends the second SR protocol domain SID to the bottom of the label stack (block 720). Referring again to the example of FIG. 5, controller 120 appends the determined SRv6 domain SID to the bottom 520-$x$ of SR-MPLS label stack 515.

Controller 120 generates a second SR protocol domain extension header containing a segment list that corresponds to segments in the second SR protocol domain sub-path (block 725). Controller 120 identifies each segment, in order, along the sub-path in domain 130 and determines the second SR protocol domain SID for each segment. In the example of FIG. 10, controller 120 determines the SRv6 domain SID for each segment based on the range of SID values included in the SRv6 SRGB. Controller 120, after determining the second SR protocol domain SID for each segment in the second SR protocol domain sub-path, inserts the identified SIDS in the segment list of the second SR protocol domain extension header (e.g., SRv6 extension header) in an order such that the SIDS may be ordered from farthest segment at near the bottom of the extension header segment list to the closest segment at the top of the segment list. For example, referring to the exemplary SRv6 extension header 615 of FIG. 6, controller 120 inserts the closest SRv6 segment SID at the top 625-1 of the segment list, and inserts the farthest SRv6 segment SID near the bottom 625-$m$–1 of the segment list of extension header 615.

Controller 120 binds the determined second SR protocol domain SID with the generated second SR protocol domain extension header within a data structure of memory (block 730). In the example of FIG. 10, controller 120 may, for example, store the determined SRv6 domain SID in association with the generated SRv6 domain extension header within a tabular data structure in a memory of controller 120. Controller 120 pushes the label stack, with appended second SR protocol domain SID, to the requesting router within the first SR protocol domain 125 (block 735). Referring to FIG. 2, controller 120 sends the label stack (e.g., SR-MPLS label stack), determined in block 710, to the ingress router 220-1 in domain 125. In the example of FIG. 10, controller 120 pushes a label stack 1005-1 to an ingress router 1000-1 in SR-MPLS domain 125 that includes labels containing the SIDs, top-to-bottom, "1001," "1004", and the SRv6 SID determined in block 715. Controller 120 pushes the second SR protocol domain extension header and second SR protocol domain SID to an ingress router 230-1, within the second SR protocol domain 130, on the path to the destination (block 740). Referring to the example of FIG. 10, controller 120 sends the SRv6 extension header, generated in block 725, to ingress router 230-1 in SRv6 domain 130. Ingress router 230-1 may subsequently use the received label stack (e.g., SR-MPLS label stack) for segment routing a data unit from router 230-1 across domain 125, and into domain 130, as described with respect to the exemplary process of FIG. 8 below. Ingress router 220-1 in domain 130 may subsequently use the received second SR protocol domain extension header, and second SR protocol domain SID, for segment routing the data unit from router 220-1 across domain 130 to the data unit's destination, as described with respect to the exemplary process of FIG. 9 below. Referring to the example of FIG. 10, controller 120 pushes the generated extension header 1010-1, that is bound to the SRv6 SID, to the ingress router 1000-4 in SRv6 domain 130.

FIG. 8 is a flow diagram of an exemplary process for an ingress router 220-1 in first SR protocol domain 125 to initiate the first SR protocol segment routing of a data unit across the first SR protocol domain sub-path and into the second SR protocol domain 130. The exemplary process of FIG. 8 may be implemented by an ingress router 220-1 (referred to below as "ingress router 220-1") within first SR protocol domain 125. The exemplary process of FIG. 8 is described below with reference to an example of network routing depicted in FIG. 10.

The exemplary process includes first SR protocol domain ingress router 220-1 receiving, from controller 120, a label stack with an appended second SR protocol domain SID for a particular sub-path within domain 125 (block 800). Ingress router 220-1 receives the label stack, with appended second SR protocol domain SID, sent from controller 120 in block 735 of FIG. 7B. Referring again to the example of FIG. 10, ingress router 1000-1 receives the SR-MPLS label stack 1005-1 sent from controller 120.

Ingress router 220-1 inspects the SR label at the top of the label stack to identify the first SR protocol domain SID (block 805). Referring to the exemplary SR-MPLS label stack 515 shown in FIG. 5, ingress router 220-1 (not shown) inspects the SR-MPLS SID at the top 520-1 of the received label stack 515 to identify the SID (i.e., "SR-MPLS_SID_1"). As shown in the example of FIG. 10, ingress router 1000-1 inspects the top label of label stack 1005-1 to identify the next SID ("1001") along the sub-path of the SR-MPLS domain 125.

Ingress router 220-1 performs a lookup based on the first SR protocol domain SID to determine a next hop for the outgoing data unit (block 810). Ingress router 220-1 stores data that maps first SR protocol domain SIDs (e.g., SR-MPLS SIDs) to particular instructions for forwarding the outgoing data unit from ingress router 220-1 to next hops along sub-paths in first SR protocol domain 125. Ingress router 220-1 pops the SR label off of the top of the label stack (block 815). Once the SR label at the top of the label stack has been inspected and used for determining forwarding instructions of the data unit, ingress router 220-1 removes the top SR label from the label stack. Referring again to the exemplary SR-MPLS label stack 515 shown in FIG. 5, ingress router 220-1 (not shown), removes the top label 520-1 from stack 515. Ingress router 220-1 forwards the outgoing data unit, with the label stack in the data unit header, towards the determined next hop (block 820). Ingress router 220-1 forwards the outgoing data unit, as determined from the inspected top SR label, out of a particular interface 310 or 340 of ingress router 220-1.

Subsequently, as further shown in the example of FIG. 10, the data unit with SR-MPLS label stack 1005-2 is received by egress router 1000-2. Egress router 1000-2 inspects the top label of label stack 1005-1 to identify the next SID ("1004") along the sub-path of the SR-MPLS domain 125, pops the top label ("1004") off of stack 1005-2 within the data unit's header, and forwards the data unit to the next segment ("1004") in the path from endpoint 205-1 to endpoint 205-2.

Figure 9A:
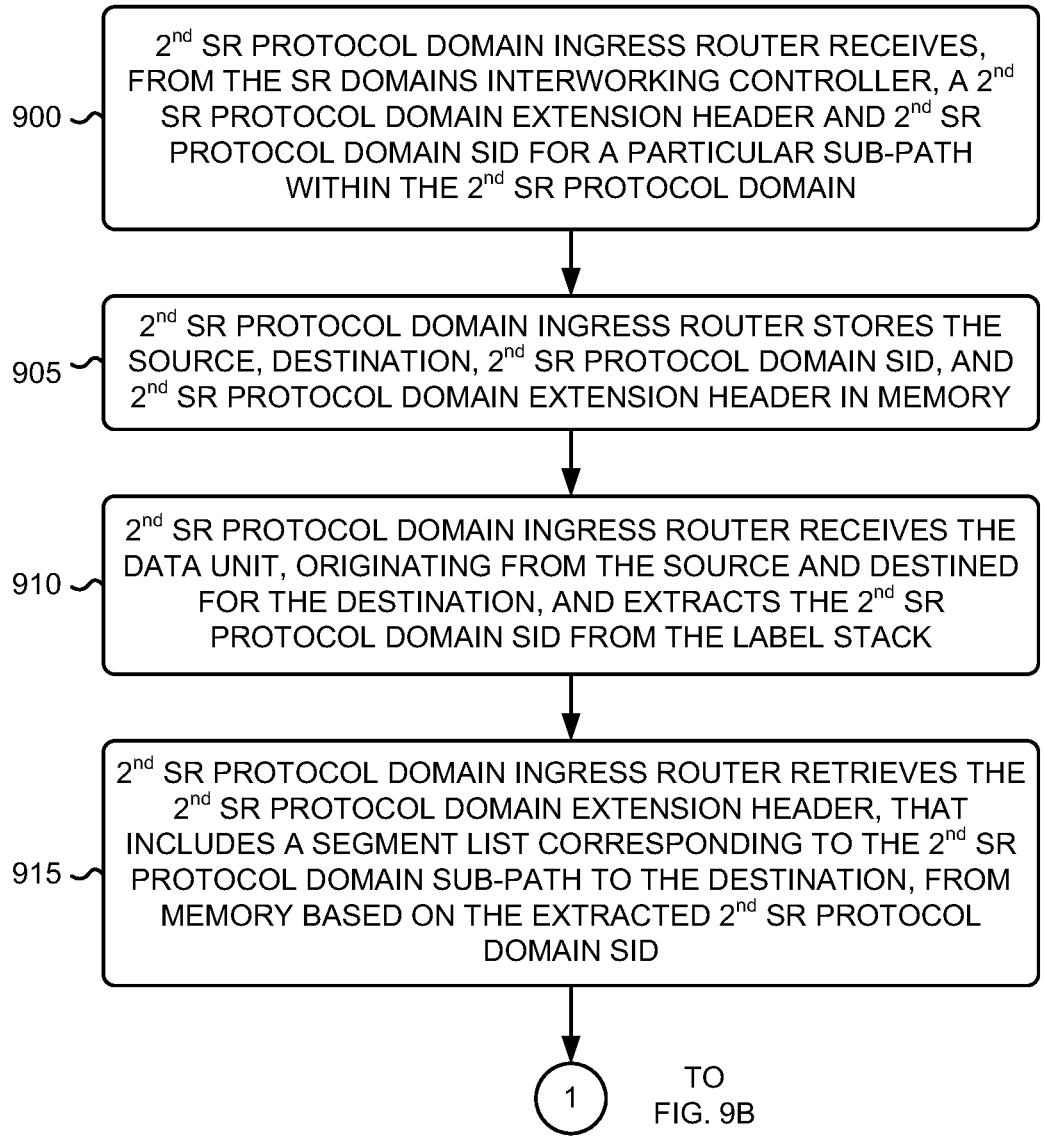
FIGS. 9A and 9B are flow diagrams of an exemplary process for an ingress router in the second segment routing protocol domain of FIG. 1 to initiate segment routing of a data unit across a second segment routing protocol domain sub-path to the data unit's destination.
Figure 9B:
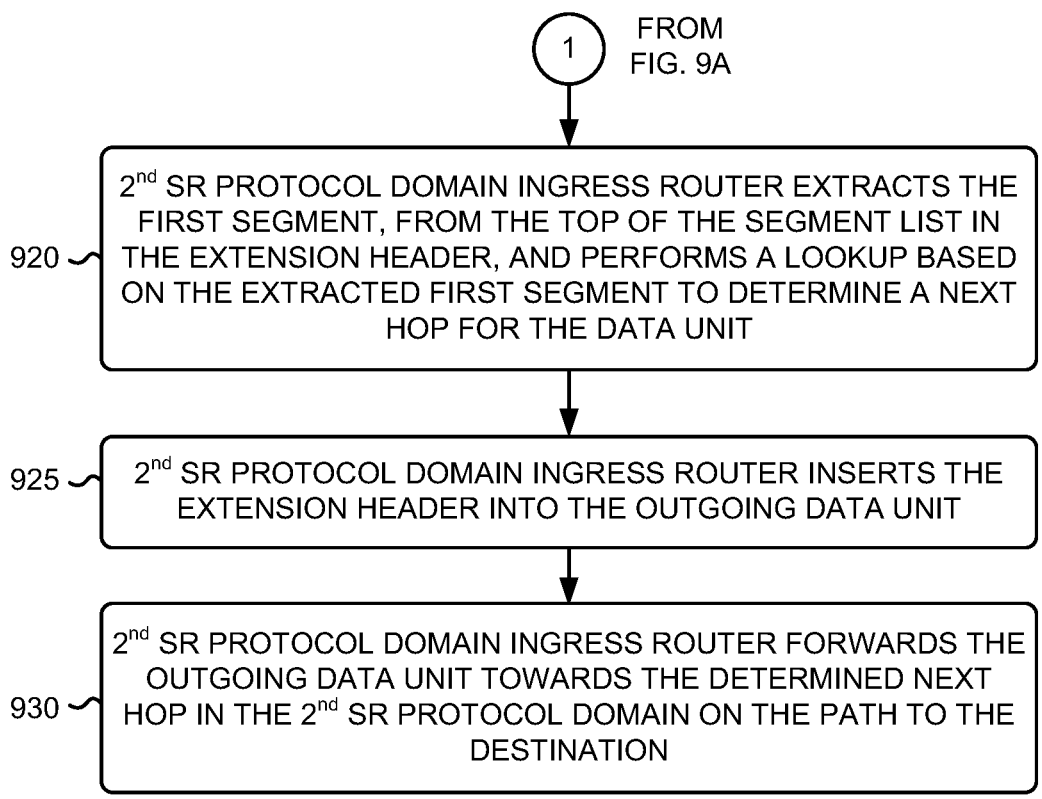
Figure 10:
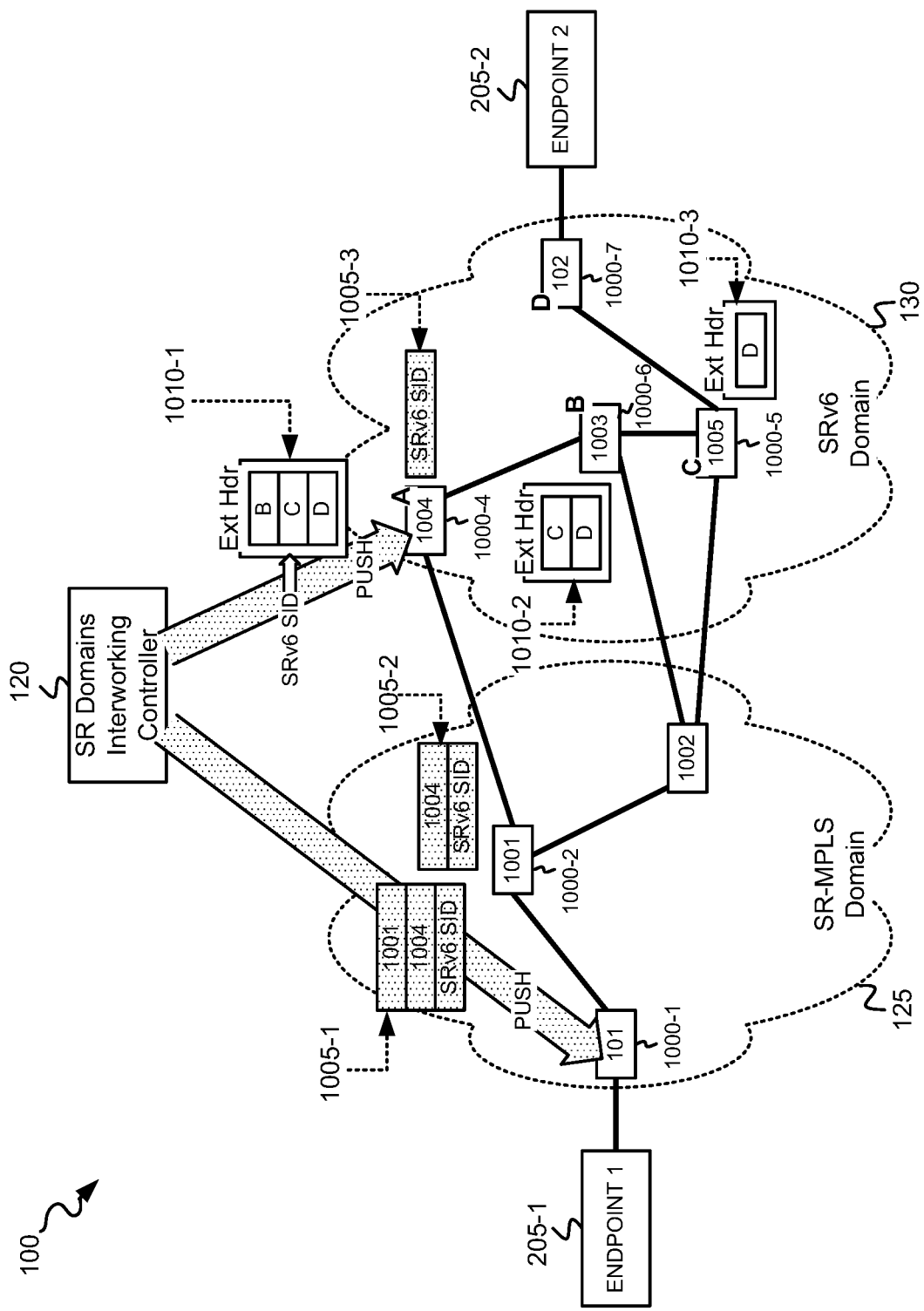
FIG. 10 illustrates an example of the segment routing across a first segment routing protocol domain and a second segment routing protocol domain described with respect to FIGS. 7A-9B.

FIGS. 9A and 9B are flow diagrams of an exemplary process for an ingress router 230-1 in second SR protocol domain 130 to initiate second SR protocol segment routing of a data unit across the second SR protocol domain sub-path 215 to the destination (e.g., endpoint 2 205-2). The exemplary process of FIGS. 9A and 9B may be implemented by an ingress router 230-1 (referred to below as "ingress router 230-1") within the second SR protocol domain 130. The exemplary process of FIGS. 9A and 9B is described below with reference to an example of network routing depicted in FIG. 10.

The exemplary process includes ingress router 230-1 receiving a second SR protocol domain extension header and a second SR protocol domain SID for a path between a source and a destination (block 900), and storing the source, destination, second SR protocol domain SID, and second SR protocol domain extension header in memory (block 905). Ingress router 230-1 may receive the second SR protocol domain extension header and second SR protocol domain SID that was sent by controller 120 in block 740 of FIG. 7B, and store the extension header and second SR protocol domain SID, in conjunction with the path's source and destination, in a data structure (e.g., a tabular data structure) in memory at ingress router 230-1. Referring to the example of FIG. 10, SRv6 domain 130 ingress router 1000-4 receives an extension header 1010-1, and bound SRv6 domain SID, received from controller 120. Extension header 1010-1 includes a segment list that includes, top-to-bottom, SRv6 domain 130 SIDS B, C, and D, where SID B corresponds to router 1000-6, SID C corresponds to router 1000-5, and SID D corresponds to router 1000-7.

Ingress router 230-1 receives the data unit, originating from the source and destined for the destination, and extracts the second SR protocol domain SID from the label stack (block 910). The second SR protocol domain SID includes the SID appended to the label stack in block 735, and forwarded by ingress router 220-1 in block 820. Ingress router 230-1 retrieves the second SR protocol domain extension header, that includes a segment list corresponding to the sub-path in second SR protocol domain 130 to the destination, from memory based on the extracted second SR protocol domain SID (block 915). Ingress router 230-1 performs a lookup, based on the second SR protocol domain SID, to retrieve a corresponding second SR protocol domain extension header in memory (e.g., received and stored in blocks 900 and 905). Referring to the example of FIG. 10, ingress router 1000-4 extracts the SRv6 domain SID from label stack 1005-3, contained in the data unit's header, and uses the SRv6 domain SID to retrieve the extension header 1010-1 previously received from controller 120 and stored in memory.

Ingress router 230-1 extracts the first segment, from the top of the segment list in the extension header, and performs a lookup based on the extracted first segment to determine a next hop in the second SR protocol domain 130 for the data unit (block 920). Referring to the exemplary SRv6 extension header 615 depicted in FIG. 6, ingress router 230-1 (not shown) extracts a segment SID for segment (0) at the top of the segment list ("segment_ID_1") in SRv6 extension header 615. Ingress router 230-1 determines a next hop in the SRv6 domain 130 based on a lookup using the extracted SRv6 SID. In the example of FIG. 10, ingress router 1000-4 extracts the first segment "B" from extension header 1010-1, and performs the lookup to determine a next hop that corresponds to segment "B."

Ingress router 230-1 inserts the second SR protocol domain extension header into the outgoing data unit (block 925), and forwards the outgoing data unit towards the determined next hop in the second SR protocol domain 130 (block 930). Ingress router 230-1, based on the next hop determined in block 920, forwards the outgoing data unit out an appropriate egress interface 310 or 340. Referring to the example of FIG. 10, ingress router 1000-4 forwards the data unit to router 1000-6, corresponding to SID B.

Subsequently, in the example of FIG. 10, router 1000-6 extracts the next segment "C" from extension header 1010-2, and performs a lookup to determine a next hop that corresponds to segment "C." Ingress router 1000-4 forwards the data unit to router 1000-5, corresponding to SID "C," along the SRv6 sub-path. Upon receipt of the data unit at router 1000-5, router 1000-5 extracts the next segment "D" from extension header 1010-3, and performs a lookup to determine a next hop that corresponds to segment "D" in SRv6 domain 130. Router 1000-5 forwards the data unit to router 1000-7, corresponding to SID "D," which, in turn, forwards the data unit to the destination endpoint 2 205-2.

Figure 11A:
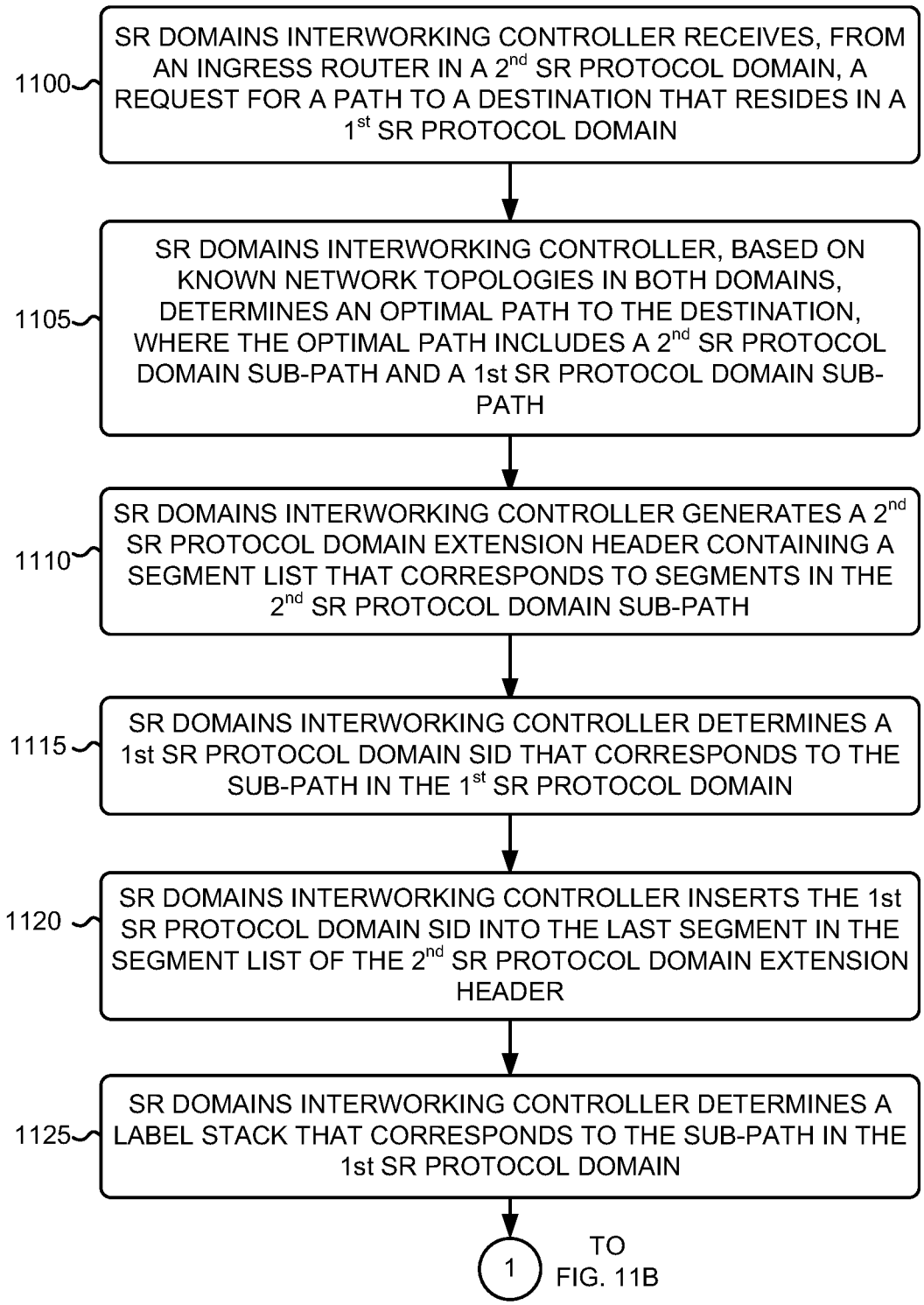
FIGS. 11A and 11B are flow diagrams of an exemplary process for establishing a path between the second segment routing protocol domain and the first segment routing protocol domain in the network of FIGS. 1 and 2.
Figure 11B:
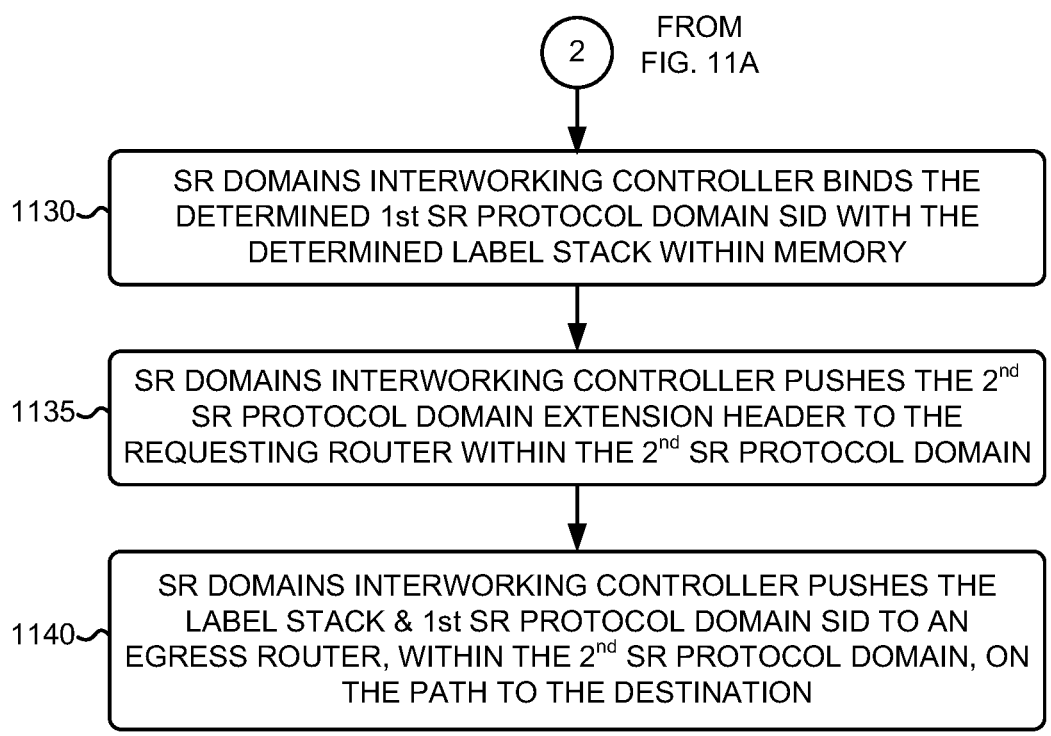
Figure 12:
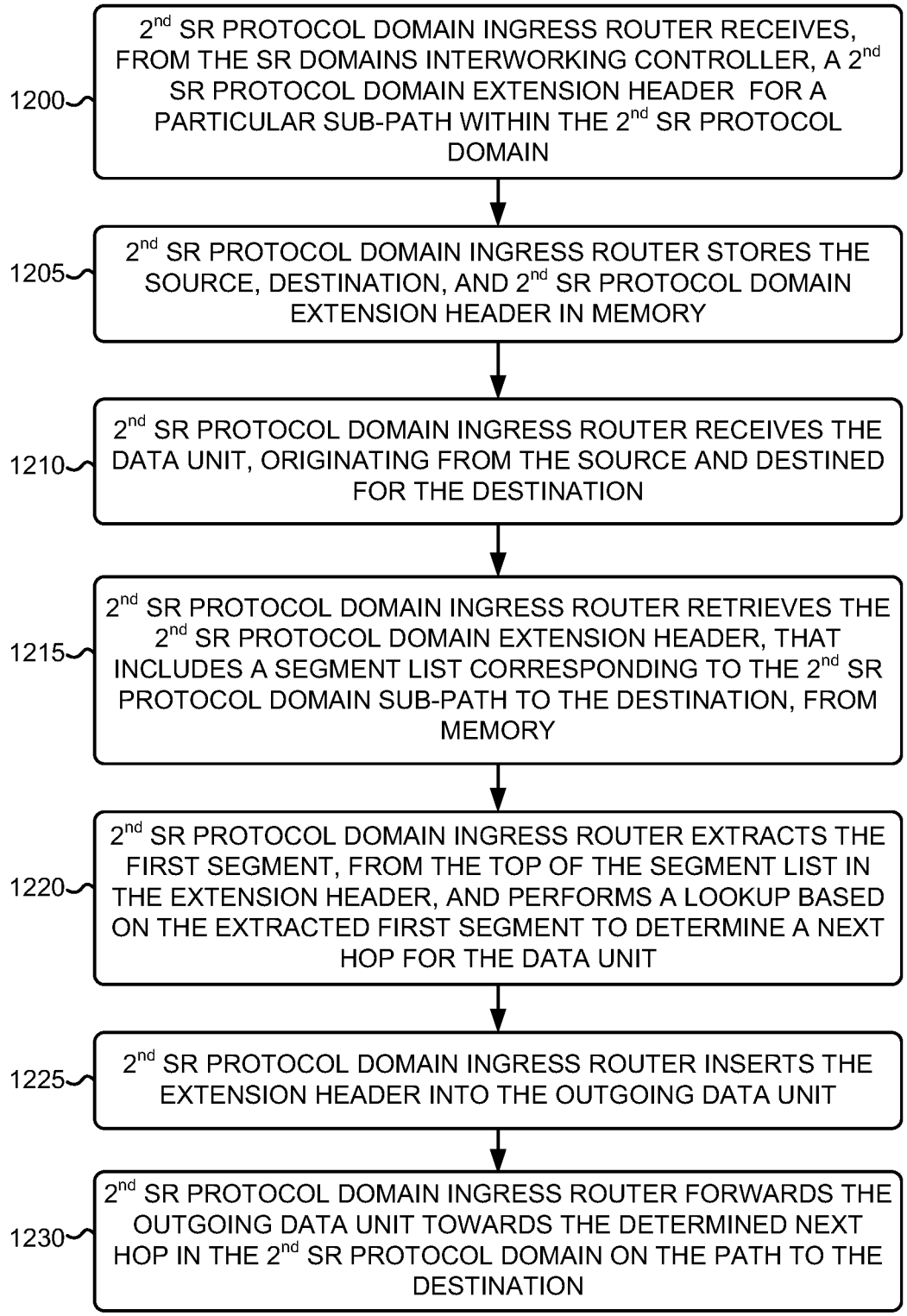
FIG. 12 is a flow diagram of an exemplary process for an ingress router in the second segment routing protocol domain of FIG. 2 to initiate segment routing of a data unit across the second segment routing protocol domain sub-path to the data unit's destination.
Figure 13A:
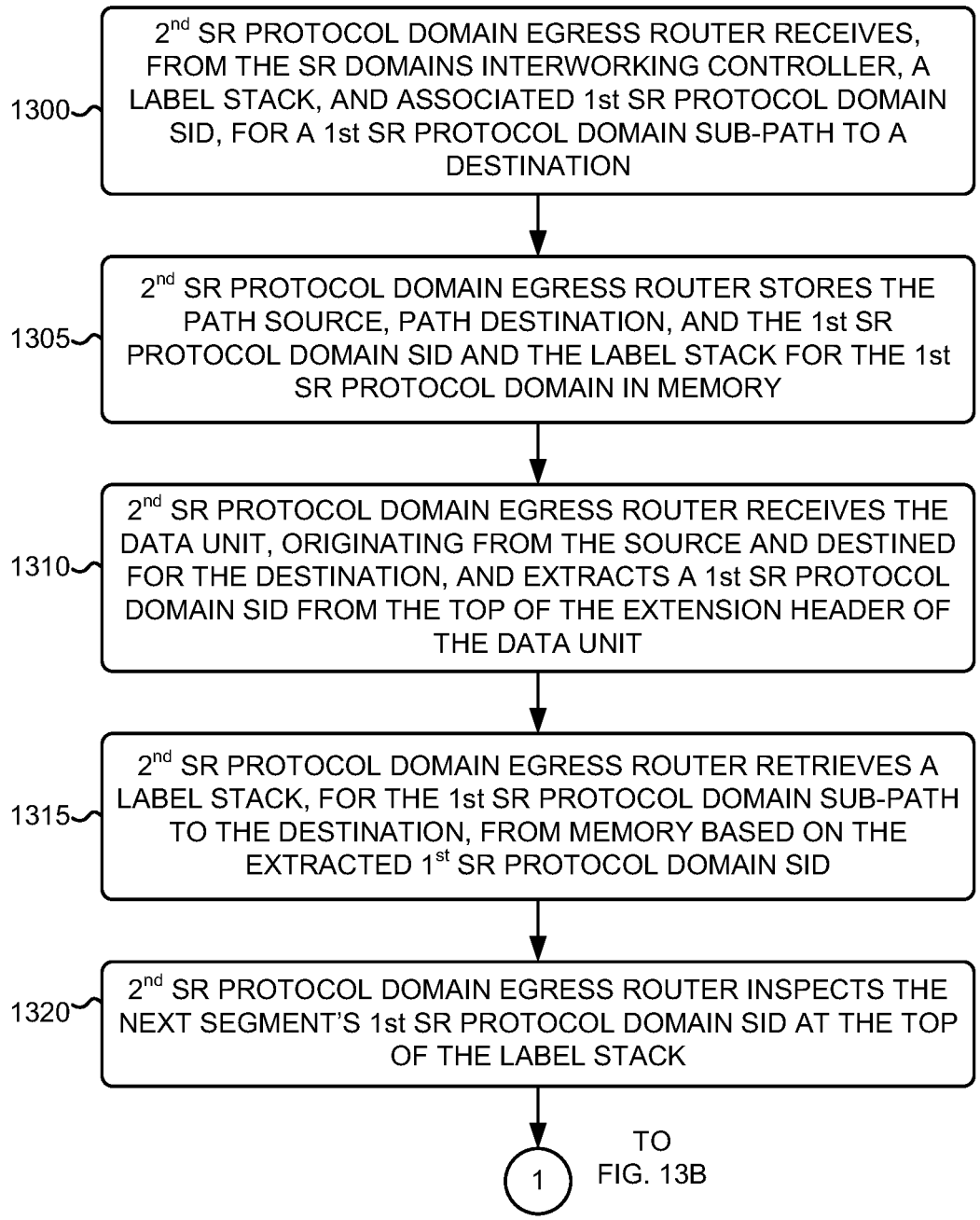
FIGS. 13A and 13B are flow diagrams of an exemplary process for an egress router in the second segment routing protocol domain of FIG. 2 to obtain a label stack and forward a data unit from the second segment routing protocol domain into the first segment routing protocol domain.
Figure 13B:
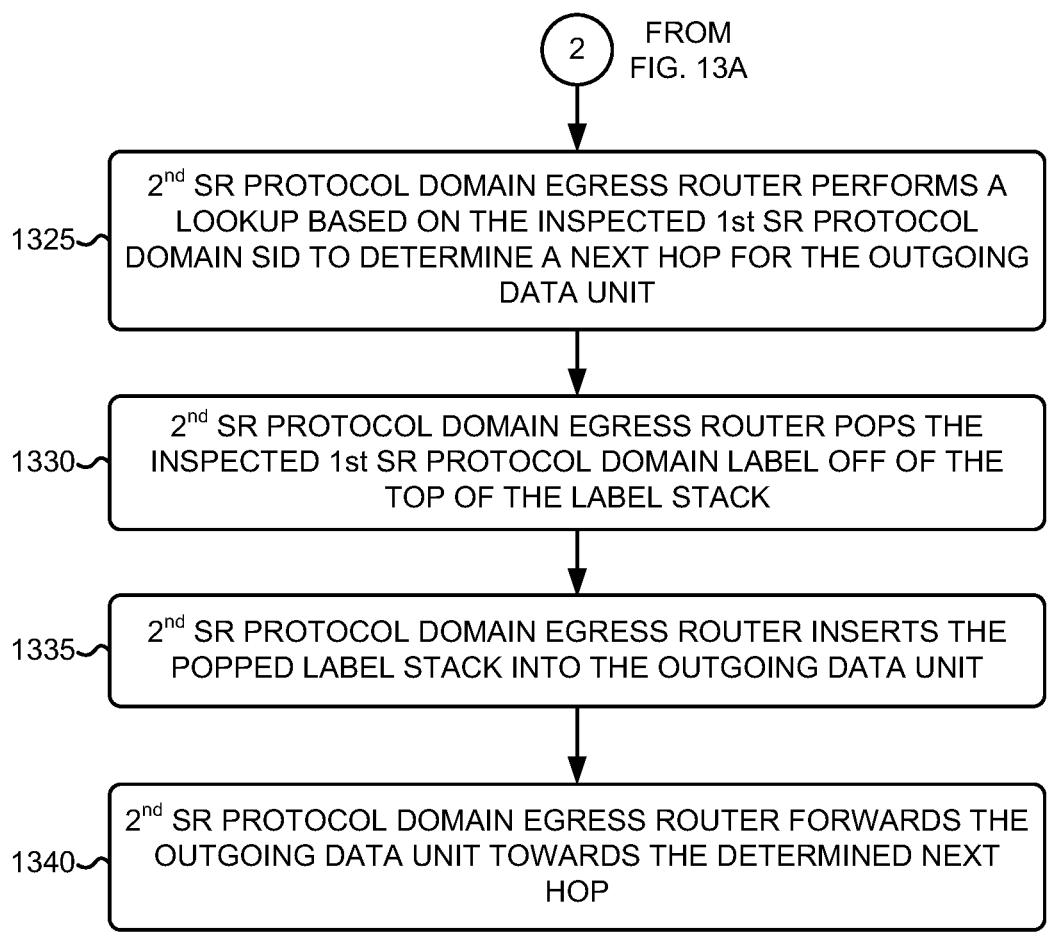
Figure 14:
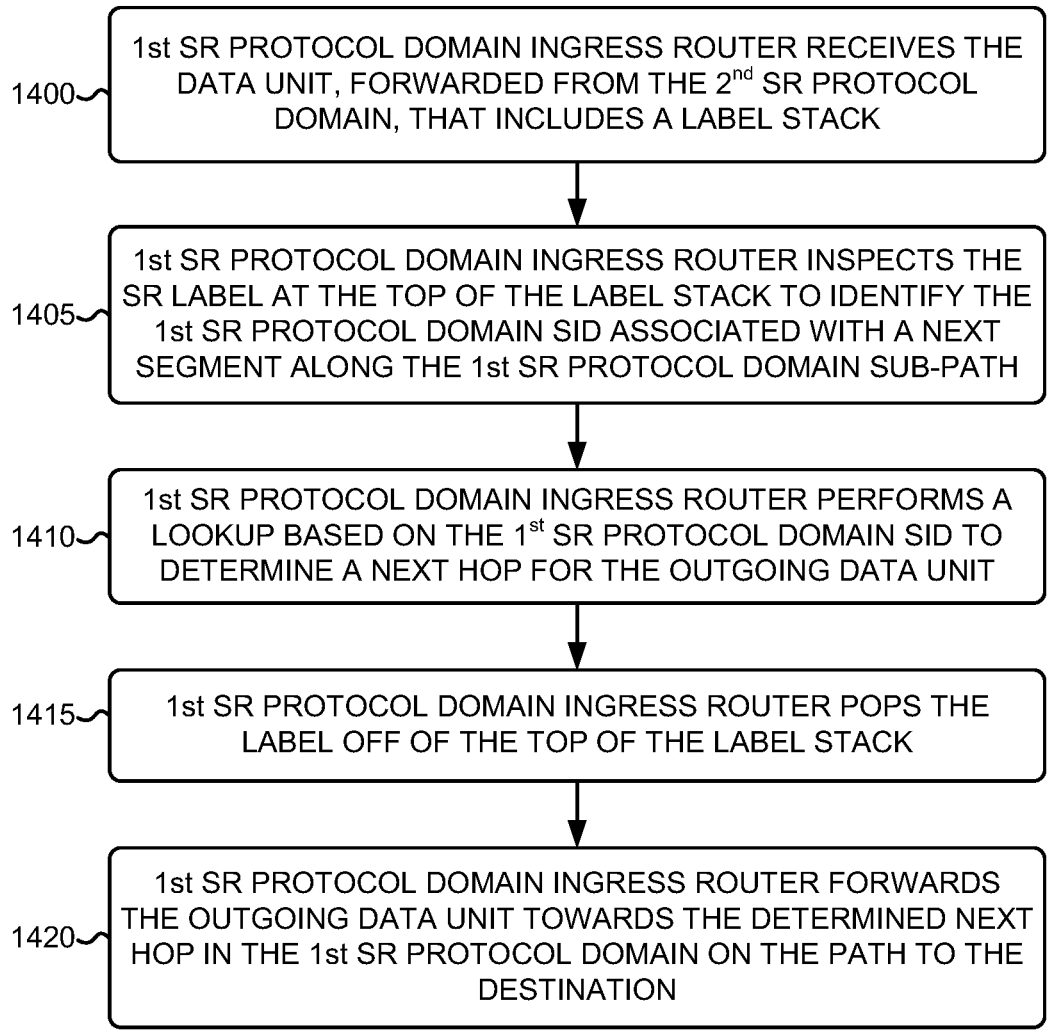
FIG. 14 is a flow diagram of an exemplary process for an ingress router in the first segment routing protocol domain of FIG. 2 to initiate the segment routing of a data unit, received from the second segment routing protocol domain, across a first segment routing protocol domain sub-path to the data unit's destination.

As described in detail below, FIGS. 11A and 11B, 12, 13A and 13B, and 14, in conjunction with the segment routing example of FIG. 15, describe exemplary processes associated with segment routing between second SR protocol domain 130 and first SR protocol domain 125 in network 105. FIGS. 11A and 11B describe path establishment, by controller 120, across second SR protocol domain 130 and first SR protocol domain 125, and the pushing of second SR protocol domain extension headers and first SR protocol label stacks to appropriate routers in domains 130 and 125 to enable the interworking of the segment routing when forwarding data units from a source to a destination over the established path across domain 130 and domain 125. FIG. 12 describes the receipt of a second SR protocol domain extension header (e.g., SRv6 extension header), from controller 120 at an ingress router in second SR protocol domain 130, and use of the extension header for forwarding data units along the established second SR protocol sub-path that corresponds to a segment list contained in the second SR protocol extension header. FIGS. 13A and 13B describe the receipt of a first SR protocol domain label stack, from controller 120 at an egress router in second SR protocol domain 130, and insertion of that label stack in an outgoing data unit for use by routers in first SR protocol domain 125 for forwarding data units along the established first SR protocol domain sub-path that corresponds to the label stack. FIG. 14 describes the receipt of a data unit at an ingress router in first SR protocol domain 125, retrieval of a top label from the first SR protocol domain label stack, and forwarding a data unit to a next hop along a sub-path through first SR protocol domain 125.

FIGS. 11A and 11B are flow diagrams of an exemplary process for establishing a path between a second SR protocol domain 130 and a first SR protocol domain 125 in network 105, and providing appropriate second SR protocol domain extension headers and first SR protocol domain label stacks to ingress and/or egress routers in those domains to enable data units to be forwarded via a path across domain 130 and domain 125 from a source to a destination. The exemplary process of FIGS. 11A and 11B may be implemented by SR domains interworking controller 120 (referred to below as "controller 120"), possibly in conjunction with first SR protocol domain controller 110 and/or second SR protocol domain controller 115. The exemplary process of FIGS. 11A and 11B is described below with reference to an example of segment routing from SRv6 domain 130 to SR-MPLS domain 125 depicted in FIG. 14.

The exemplary process includes controller 120 receiving, from an ingress router 230-2 in second SR protocol domain 130, a request for a path to a destination that resides in first SR protocol domain 125 (block 1100). For example, ingress router 230-2, in second SR protocol domain 130, may send a request that requests a path from ingress router 230-2 to a destination (e.g., endpoint 1 205-1), where the path crosses first SR protocol domain 125. In one implementation, ingress router 230-2 may send the request to second SR protocol domain controller 115 which, in turn, may forward the request to SR domains interworking controller 120. Controller 120, based on known network topologies in both of domain 130 and domain 125, determines an optimal path to the destination, where the optimal path includes a second SR protocol domain sub-path and a first SR protocol domain sub-path (block 1105). Controller 120 may employ existing network routing techniques to determine the optimal path from ingress router 220-1 to the destination of the data unit.

Controller 120 generates a second SR protocol domain extension header containing a segment list that corresponds to segments in the second SR protocol domain sub-path (block 1110). Controller 120 identifies each segment, in order, along the sub-path in domain 130 and determines the second SR protocol domain SID for each segment. In an example in which second SR protocol domain 130 includes a SRv6 domain, the SRv6 domain 130 may be associated with a Segment Routing Global Block (SRGB) that includes a range of segment ID values that are reserved for segment routing among SRv6-enabled nodes and which have global significance throughout the SRv6 domain 130. In this example, controller 120 inserts the identified SIDs in a segment list of the SRv6 extension header in an order such that the SIDs are ordered from farthest segment at the bottom of the segment list to the closest segment at the top of the segment list. For example, referring to the exemplary SRv6 extension header 615 of FIG. 6, controller 120 inserts the closest segment SRv6 SID as segment (0) at the top of the extension header, inserts the next closest segment SID as segment (1) in the extension header, and so on until controller 120 inserts a last, farthest SRv6 SID at segment (m−1) in the extension header.

Controller 120 determines a first SR protocol domain SID that corresponds to the sub-path in the first SR protocol domain 125 (block 1115) and inserts the determined first SR protocol domain SID into the last segment in the segment list of the extension header (block 1120). Controller 120 determines, from the first SR protocol domain SRGB, a SID to be used to identify the sub-path in the first SR protocol domain 125. Referring again to FIG. 6, controller 120 (not shown) inserts the determined SR-MPLS SID in a last field (segment (m) 625-$m$ in SRv6 extension header 615.

Controller 120 determines a label stack that corresponds to the sub-path in the first SR protocol domain 125 (block 1125). Controller 120 identifies each segment, in order, along the sub-path in domain 125 and determines the first SR protocol domain SID for each segment. Controller 120 identifies the segment SIDs for the segments along the sub-path from the first SR protocol domain SRGB for the first SR protocol domain 125. Controller 120 inserts the identified SIDs in a label stack in an order such that the SIDs are ordered from farthest segment at the bottom of the label stack to the closest segment at the top of the stack. For example, referring again to the exemplary SR-MPLS label stack 515 of FIG. 5, controller 120 inserts the closest segment SID at the top 520-1 of the stack 515, inserts the next closest segment SID at the next label 520-2, inserts the third closest segment SID at the next label 520-3, and so on until controller 120 inserts a last, farthest segment SID at the position 520-$x$−1 in the label stack 515.

Controller 120 binds the determined first SR protocol domain SID with the determined label stack within memory (block 1130). Controller 120 may, in one example, store a determined SR-MPLS domain SID in association with a generated SR-MPLS label stack within a tabular data structure in a memory of controller 120 for future look-up and retrieval.

Controller 120 pushes the second SR protocol extension header to the requesting ingress router 230-2 within the second SR protocol domain 130 (block 1135). Controller 120 sends the second SR protocol domain extension header, generated in blocks 1110-1120, to ingress router 230-2 in second SR protocol domain 130. Ingress router 220-2 in second SR protocol domain 130 may subsequently use the received second SR protocol domain extension header (e.g., SRv6 extension header) for segment routing the data unit from router 230-2 across domain 130 to domain 125, as described with respect to the exemplary processes of FIGS. 12 and 13 below. Referring to the example of FIG. 15, controller 120 pushes the generated SRv6 extension header 1500-1 to ingress router 1000-7 in SRv6 domain 130.

Controller 120 pushes the label stack and the first SR protocol domain SID to an egress router 230-1, within the second SR protocol domain 130, on the path to the destination (block 1140). Controller 120 sends the label stack, determined in block 1125, and the first SR protocol domain SID, determined in block 1115, to the egress router 230-1 in domain 130. When the data unit is received at egress router 230-1, egress router 230-1 may insert the label stack in the outgoing data unit before forwarding the data unit to ingress router 220-2 in first SR protocol domain 125, as described with respect to the exemplary process of FIG. 13 below. Referring to the example of FIG. 15, controller 120 pushes the SR-MPLS label stack, along with the SR-MPLS domain SID, to egress router 1000-4 in SRv6 domain 130.

FIG. 12 is a flow diagram of an exemplary process for an ingress router 230-2 in second SR protocol domain 130 to initiate second SR protocol segment routing of a data unit across the second SR protocol domain sub-path 215 to the destination (e.g., endpoint 1 205-1). The exemplary process of FIG. 12 may be implemented by an ingress router 230-2 (referred to below as "ingress router 230-2") within second SR protocol domain 130. The exemplary process of FIG. 12 is described below with reference to an example of network routing depicted in FIG. 15.

The exemplary process includes ingress router 230-2 receiving, from controller 120, a second SR protocol domain extension header for a particular sub-path between a source and a destination within second SR protocol domain 130 (block 1200), and storing the source, destination, and extension header in memory (block 1205). Ingress router 230-2 may receive the second SR protocol extension header that was sent by controller 120 in block 1135 of FIG. 11B, and store the extension header, in conjunction with the path's source and destination, in a data structure (e.g., a tabular data structure) in memory at ingress router 230-2. As shown in the example of FIG. 15, ingress router 1000-7 in SRv6 domain 130 receives the extension header 1500-1 that includes the segment list ("C," "B," "A") for the sub-path through SRv6 domain 130.

Ingress router 230-2 receives the data unit, originating from the source and destined for the destination (block 1210), and retrieves the second SR protocol domain extension header, that includes a segment list corresponding to the second SR protocol domain sub-path to the destination, from memory (block 1215). Ingress router 230-1 performs a lookup, based on the data unit's source and destination, to retrieve a corresponding second SR protocol extension header in memory (e.g., received and stored in blocks 1200 and 1205). In the example of FIG. 15, ingress router 1000-7 retrieves extension header 1500-1 from memory that was previous received from controller 120 (in block 1200).

Ingress router 230-2 extracts the first segment, from the top of the segment list in the extension header, and performs a lookup based on the extracted first segment to determine a next hop in domain 130 for the data unit (block 1220). Referring to the exemplary SRv6 extension header 615 depicted in FIG. 6, ingress router 230-1 (not shown) extracts a segment SID for segment (0) at the top of the segment list ("segment_ID_1") in SRv6 extension header 615. In the example of FIG. 15, ingress router 1000-7 extracts SRv6 domain 130 segment SID "C" from the top of the segment list of extension header 1500-1. Ingress router 230-2 determines a next hop in the SRv6 domain 130 based on a lookup using the extracted SRv6 SID. Ingress router 230-2 inserts the second SR protocol domain extension header into the outgoing data unit (block 1225) and forwards the outgoing data unit towards the determined next hop in domain 130 (block 1230). Ingress router 230-2, based on the next hop determined in block 1220, forwards the outgoing data unit out an appropriate egress interface 310 or 340. In the example of FIG. 15, ingress router 1000-7 forwards the data unit, along with extension header 1500-2, to router 1000-5 that corresponds to SID "C" along the sub-path of SRv6 domain 130.

Upon receipt of the data unit, router 1000-5 extracts the SRv6 domain 130 segment SID "B" from the top of the segment list of extension header 1500-2. Router 1000-5 determines a next hop in the SRv6 domain 130 based on a lookup using the extracted SRv6 SID, and forwards the data unit, along with an extension header 1500-3, to router 1000-6 that corresponds to SID "B" along the sub-path of SRv6 domain 130.

Figure 15:
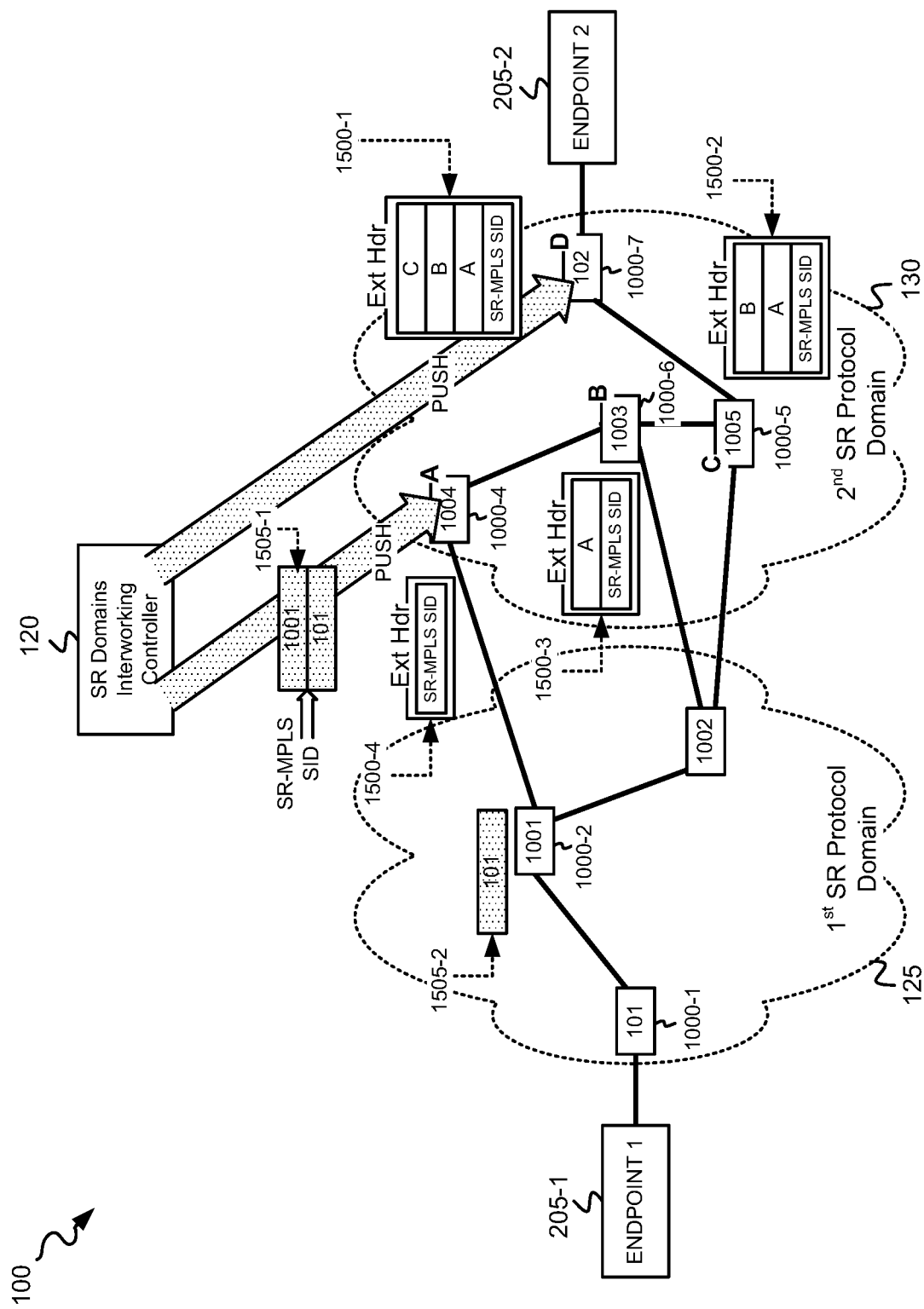
FIG. 15 illustrates an example of the segment routing across a second segment routing protocol domain and a first segment routing protocol domain described with respect to FIGS. 11A-14.

As further shown in the example of FIG. 15, upon receipt of the data unit, router 1000-6 extracts the SRv6 domain 130 segment SID "A" from the top of the segment list of extension header 1500-3. Router 1000-6 determines a next hop in the SRv6 domain 130 based on a lookup using the extracted SRv6 SID, and forwards the data unit, along with an extension header 1500-4, to router 1000-4 that corresponds to SID "A" along the sub-path of SRv6 domain 130.

FIGS. 13A and 13B are flow diagrams of an exemplary process for an egress router 230-1 in second SR protocol domain 130 to obtain a first SR protocol domain label stack and forward a data unit from domain 130 into first SR protocol domain 125 such that the label stack can be used for segment routing of the data unit through the first SR protocol domain sub-path to the data unit's destination (e.g., endpoint 1 205-1). The exemplary process of FIGS. 13A and 13B may be implemented by an egress router 230-1 (referred to below as "egress router 230-1") within second SR protocol domain 130. The exemplary process of FIGS. 13A and 13B is described below with reference to an example of network routing depicted in FIG. 15.

The exemplary process includes egress router 230-1 receiving, from controller 120, a label stack, and an associated first SR protocol domain SID, for a first SR protocol domain sub-path in first SR protocol domain 125 to a destination (block 1300), and storing the path source, path destination, and first SR protocol domain SID and the label stack for the first SR protocol domain sub-path in memory (block 1305). Egress router 230-1 may receive the label stack, and associated first SR protocol domain SID, that was sent by controller 120 in block 1140, and store the label stack, in conjunction with the first SR protocol domain SID, in a data structure (e.g., a tabular data structure) in memory at egress router 230-1. Referring to the example of FIG. 15, egress router 1000-4 of SRv6 domain 130 receives a SR-MPLS label stack 1505-1, and an associated SR-MPLS SID, that corresponds to a sub-path through SR-MPLS domain 125.

Egress router 230-1 receives the data unit, originating from the source and destined for the destination, extracts the first SR protocol domain 125 segment SID from the top of the extension header of the data unit (block 1310), and retrieves a label stack, for the first SR protocol domain sub-path to the destination, from memory based on the extracted first SR protocol domain SID (block 1315). Referring again to the exemplary SRv6 extension header 615 of FIG. 6, egress router 230-1 extracts the SR-MPLS domain SID ("SR-MPLS_SID") stored in the last segment (m) of the extension header 615. Egress router 230-1 uses the extracted first SR protocol domain SID as a pointer in memory to retrieve the label stack for the first SR protocol domain sub-path stored in block 1305. In the example of FIG. 15, router 1000-4 retrieves the SR-MPLS SID from extension header 1500-4 of the received data unit, and uses the SR-MPLS SID as a pointer to retrieve the previous received and stored SR-MPLS label stack 1505-1 from memory.

Egress router 230-1 inspects the next segment's first SR protocol domain SID at the top of the retrieved label stack (block 1320), and performs a lookup based on the extracted SID segment to determine a next hop for the outgoing data unit (block 1325). Referring to the exemplary SR-MPLS label stack 515 of FIG. 5, egress router 230-1 inspects the top label 520-1 of label stack 515 to identify a SR-MPLS SID of a next segment on the path towards endpoint 205-1. In the example of FIG. 15, router 1000-4 inspects the label ("1001") at the top of the label stack 1505-1 to identify the next segment's SID along the path to the destination 205-1. Egress router 230-1 stores data that maps SR-MPLS SIDs to particular instructions for forwarding the outgoing data unit from egress router 230-1 to next hops along the sub-path in SR-MPLS domain 125.

Egress router 230-1 pops the inspected first SR protocol domain label off of the top of the label stack (block 1330) and inserts the popped label stack into the outgoing data unit (block 1335). Once the SR label at the top of the label stack has been inspected and used for determining forwarding instructions of the data unit, egress router 230-1 removes the top label from the label stack. Referring to the exemplary SR-MPLS data unit 500 of FIG. 5, egress router 230-1 (not shown) inserts the popped SR-MPLS label stack 515 in header 505 of data unit 500. Egress router 230-1 forwards the outgoing data unit towards the determined next hop (block 1340). Egress router 230-1, based on the next hop determined in block 1325, forwards the outgoing data unit out an appropriate egress interface 310 or 340 towards ingress router 220-2 of first SR protocol domain 125. In the example of FIG. 15, router 1000-4 pops the top label ("1001") off of label stack 1505-1, and inserts the popped label stack 1505-2 in the header of the outgoing data unit. Router 1000-4 then forwards the outgoing data unit out an appropriate egress interface 310 or 340 towards router 1000-2.

FIG. 14 is a flow diagram of an exemplary process for an ingress router 220-1 in first SR protocol domain 125 to initiate the first SR protocol segment routing of a data unit, received from second SR protocol domain 130, across the first SR protocol domain sub-path to the data unit's destination (e.g., endpoint 205-1). The exemplary process of FIG. 14 may be implemented by an ingress router 220-2 (referred to below as "ingress router 220-2") within first SR protocol domain 125. The exemplary process of FIG. 14 is described below with reference to an example of network routing depicted in FIG. 15.

The exemplary process includes ingress router 220-2 receiving a data unit, forwarded from the second SR protocol domain 130, that includes a first SR protocol domain label stack (block 1400). Ingress router 220-2 receives the data unit forwarded from egress router 230-1 in block 1335 of FIG. 13B. Ingress router 220-2 inspects the SR label at the top of the label stack to identify the first SR protocol domain SID associated with a next segment along the first SR protocol domain sub-path (block 1405), and performs a lookup based on the first SR protocol domain SID to determine a next hop for the outgoing data unit (block 1410). Referring to the exemplary SR-MPLS label stack 515 shown in FIG. 5, ingress router 220-2 (not shown) inspects the SR-MPLS SID at the top 520-1 of the received label stack 515 to identify the SID (i.e., "SR-MPLS_SID_1"). Ingress router 220-2 stores data that maps first SR protocol domain SIDs to particular instructions for forwarding the outgoing data unit from ingress router 220-2 to next hops along sub-paths in first SR protocol domain 125. The routing example of FIG. 15 shows router 1000-2 receiving a data unit from router 1000-4 that includes SR-MPLS label stack 1505-2. Inspection of the top (and only) label of label stack 1505-2 identifies a SR-MPLS SID label ("101") for a last segment in SR-MPLS domain 125.

Ingress router 220-2 pops the first SR protocol domain label off of the top of the label stack (block 1415). Once the SR SID label at the top of the label stack has been inspected and used for determining forwarding instructions of the data unit, ingress router 220-2 removes the top label from the label stack. Referring again to the exemplary SR-MPLS label stack 515 shown in FIG. 5, ingress router 220-2 (not shown), removes the top label 520-1 from stack 515. Ingress router 220-2 forwards the outgoing data unit towards the determined next hop in first SR protocol domain 125 (block 1420). Ingress router 220-2 forwards the outgoing data unit, to a next hop determined from the inspected top SR label, out of a particular interface 310 or 340 of ingress router 220-1. Returning to the routing example of FIG. 15, router 1000-2 pops the top label ("101") from the label stack 1505-2 of the data unit, and then forwards the data unit out of an appropriate egress interface 310 or 340 to router 1000-1 in SR-MPLS domain 125. The data unit may thereafter be routed, using the first SR protocol domain routing protocol (e.g., SR-MPLS), across the remaining nodes of first SR protocol domain 125 on the sub-path to the destination endpoint 205-1. For example, referring to FIG. 15, router 1000-1 (as a last node in the SR-MPLS sub-path to the destination), upon receipt of the data unit, forwards the data unit to the data unit's destination endpoint 205-1.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 7A, 7B, 8, 9A, 9B, 11A, 11B, 12, 13A, 13B, and 14, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    determining, by a controller, a first path across a first segment routing (SR) domain and a second SR domain to a destination in the second SR domain, wherein the first SR domain uses a first SR protocol and the second SR domain uses a second SR protocol that is different than the first SR protocol;
    determining, by the controller, SR instructions that enable the interworking of the first SR domain and the second SR domain when data is routed across the first path to the destination; and
    sending, by the controller prior to the data being routed over the first path, the SR instructions to a first ingress router in the first SR domain and to one of a second ingress router in the second SR domain or an egress router in the first SR domain to enable the interworking of the first and the second SR domains for segment routing the data across the first path.

2. The method of claim 1, wherein the first path includes a first sub-path in the first SR domain and a second sub-path in the second SR domain, and wherein the first ingress router is located at a beginning of the first sub-path, the egress router is located at an end of the first sub-path, and the second ingress router is located at a beginning of the second sub-path.

3. The method of claim 1, wherein sending the SR instructions further comprises:
    sending, by the controller prior to the data being routed over the first path, first SR instructions of the SR instructions to the first ingress router and second SR instructions of the SR instructions to the second ingress router or the egress router, wherein the first SR instructions conform to the first SR protocol and the second SR instructions conform to the second SR protocol.

4. The method of claim 1, wherein determining the SR instructions further comprises:
   determining, by the controller, first SR instructions, that conform to the first SR protocol, for segment routing the data across the first SR domain via a first sub-path of the first path; and
   determining, by the controller, second SR instructions, that conform to the second SR protocol, for segment routing the data across the second SR domain via a second sub-path of the first path.

5. The method of claim 4, wherein the first SR protocol comprises a SR label switching protocol and wherein the second SR protocol comprises a SR over Internet Protocol (IP) protocol and wherein determining the first SR instructions further comprises:
   determining a SR label switching label stack that corresponds to the first sub-path; and
   wherein determining the second SR instructions further comprises:
      generating a SR over IP extension header containing a segment list that corresponds to segments in the second sub-path.

6. The method of claim 5, wherein sending the SR instructions further comprises:
   sending the SR label switching label stack to the first ingress router, and
   sending the generated SR over IP extension header to the second ingress router or the egress router.

7. The method of claim 4, wherein the first SR protocol comprises a SR over Internet Protocol (IP) protocol and wherein the second SR protocol comprises a SR label switching protocol and wherein determining the first SR instructions further comprises:
   generating a SR over IP extension header containing a segment list that corresponds to segments in the first sub-path; and
   wherein determining the second SR instructions further comprises:
      determining a SR label switching label stack that corresponds to the second sub-path.

8. The method of claim 7, wherein sending the SR instructions further comprises:
   sending the SRv6 extension header to the first ingress router; and
   sending the SR-MPLS label stack to the second ingress router or the egress router.

9. The method of claim 1, wherein determining the SR instructions that enable the interworking of the first SR domain and the second SR domain further comprises:
   determining, by the controller, first SR instructions of the SR instructions, that conform to the first SR protocol, for segment routing the data across the first SR domain via a first sub-path of the first path; and
   determining, by the controller, second SR instructions of the SR instructions, that conform to the second SR protocol, for segment routing the data across the second SR domain via a second sub-path of the first path,
   wherein sending the SR instructions further comprises:
      sending, by the controller prior to the data being routed over the first path, the first SR instructions to the first ingress router in the first SR domain to enable segment routing of data towards the destination via the first sub-path; and
      sending, by the controller prior to the data being routed over the first path, the sending, by the controller prior to the data being routed over the first path, the second SR instructions to the second ingress router or the egress router to enable segment routing of data towards the destination via the second sub-path.

10. The method of claim 1, wherein the first SR protocol comprises a SR-Multiprotocol Label Switching (SR-MPLS) protocol and wherein the second SR protocol comprises a SR over Internet Protocol version 6 (SRv6) protocol, or
    wherein the first SR protocol comprises a SR over Internet Protocol version 6 (SRv6) protocol and wherein the second SR protocol comprises a SR-Multiprotocol Label Switching (SR-MPLS) protocol.

11. The method of claim 1, wherein the first path includes a first sub-path in the first SR domain and a second sub-path in the second SR domain and wherein determining the first path further comprises:
    determining the first sub-path based on a known network topology of the first SR domain; and
    determining the second sub-path based on a known network topology of the second SR domain.

12. A network device, comprising:
    a communication interface; and
    a processor to:
       determine a first path across a first segment routing (SR) domain and a second SR domain to a destination in the second SR domain, wherein the first SR domain uses a first SR protocol and the second SR domain uses a second SR protocol that is different than the first SR protocol,
       determine SR instructions that enable the interworking of the first SR domain and the second SR domain when data is routed across the first path to the destination, and
       send, via the communication interface prior to the data being routed over the first path, the SR instructions to a first ingress router in the first SR domain and to one of a second ingress router in the second SR domain or an egress router in the first SR domain to enable the interworking of the first and the second SR domains for segment routing the data across the first path.

13. The network device of claim 12, wherein the first path includes a first sub-path in the first SR domain and a second sub-path in the second SR domain, and wherein the first ingress router is located at a beginning of the first sub-path, the egress router is located at an end of the first sub-path, and the first ingress router is located at a beginning of the second sub-path.

14. The network device of claim 12, wherein, when determining the SR instructions, the processor further:
    determines first SR instructions of the SR instructions, that conform to the first SR protocol, for segment routing the data across the first SR domain via a first sub-path of the first path; and
    determines second SR instructions of the SR instructions, that conform to the second SR protocol, for segment routing the data across the second SR domain via a second sub-path of the first path.

15. The network device of claim 14, wherein the first SR protocol comprises a SR label switching protocol, wherein the second SR protocol comprises a SR over Internet Protocol (IP) protocol,
    wherein, when determining the first SR instructions, the processor further:

determines a SR label switching label stack that corresponds to the first sub-path,
wherein, when determining the second SR instructions, the processor further:
generates a SR over IP extension header containing a segment list that corresponds to segments in the second sub-path, and
wherein, when sending the SR instructions, the processor further:
sends the SR label switching label stack to the first ingress router, and
sends the generated SR over IP extension header to the second ingress router or the egress router.

16. The network device of claim 14, wherein the first SR protocol comprises a SR over Internet Protocol (IP) protocol, wherein the second SR protocol comprises a SR label switching protocol,
wherein, when determining the first SR instructions, the processor further:
generates a SR over IP extension header containing a segment list that corresponds to segments in the first sub-path,
wherein, when determining the second SR instructions, the processor further:
determines a SR label switching label stack that corresponds to the second sub-path, and
wherein, when sending the SR instructions, the processor further:
sends the SR over IP extension header to the first ingress router; and
sends the SR label switching label stack to the second ingress router or the egress router.

17. The network device of claim 12, wherein, when determining the SR instructions, the processor further:
determines first SR instructions of the SR instructions, that conform to the first SR protocol, for segment routing the data across the first SR domain via a first sub-path of the first path; and
determines second SR instructions of the SR instructions, that conform to the second SR protocol, for segment routing the data across the second SR domain via a second sub-path of the first path,
wherein, when sending the SR instructions, the processor further:
sends, prior to the data being routed over the first path, the first SR instructions to the first ingress router in the first SR domain to enable segment routing of data towards the destination via the first sub-path; and
sends, prior to the data being routed over the first path, the second SR instructions to the second ingress router or the egress router to enable segment routing of data towards the destination via the second sub-path.

18. A non-transitory storage medium storing instructions executable by a network device with one or more processors, wherein execution of the instructions causes the network device to:

determine a first path across a first segment routing (SR) domain and a second SR domain to a destination in the second SR domain, wherein the first SR domain uses a first SR protocol and the second SR domain uses a second SR protocol that is different than the first SR protocol;
determine SR instructions that enable the interworking of the first SR domain and the second SR domain when data is routed across the first path to the destination; and
send, prior to the data being routed over the first path, the SR instructions to a first ingress router in the first SR domain and to one of a second ingress router in the second SR domain or an egress router in the first SR domain to enable the interworking of the first and the second SR domains for segment routing the data across the first path.

19. The non-transitory storage medium of claim 18, wherein execution of the instructions to cause the network device to send the SR instructions further causes the network device to:
send, prior to the data being routed over the first path, first SR instructions of the SR instructions to the first ingress router and second SR instructions of the SR instructions to the second ingress router or the egress router,
wherein the first SR instructions conform to the first SR protocol and the second SR instructions conform to the second SR protocol.

20. The non-transitory storage medium of claim 18, wherein execution of the instructions to cause the network device to determine the SR instructions further causes the network device to:
determine first SR instructions of the SR instructions, that conform to the first SR protocol, for segment routing the data across the first SR domain via a first sub-path of the first path; and
determine second SR instructions of the SR instructions, that conform to the second SR protocol, for segment routing the data across the second SR domain via a second sub-path of the first path, and
wherein execution of the instructions to cause the network device to send the SR instructions further causes the network device to:
send, prior to the data being routed over the first path, the first SR instructions to the first ingress router in the first SR domain to enable segment routing of data towards the destination via the first sub-path, and
send, prior to the data being routed over the first path, the second SR instructions to the second ingress router or the egress router to enable segment routing of data towards the destination via the second sub-path.

* * * * *